US012463695B2

(12) United States Patent
Malkov et al.

(10) Patent No.: US 12,463,695 B2
(45) Date of Patent: Nov. 4, 2025

(54) BEAM NULLING METHOD FOR CROSS-SECTOR INTERFERENCE SUPPRESSION

(71) Applicant: Nokia Solutions and Networks Oy, Espoo (FI)

(72) Inventors: Andrei Malkov, Espoo (FI); Ulf Peter Falk, Espoo (FI); Risto Pekka Valkonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/169,238

(22) Filed: Apr. 3, 2025

(65) Prior Publication Data
US 2025/0317173 A1    Oct. 9, 2025

(30) Foreign Application Priority Data

Apr. 8, 2024  (FI) .................................... 20245432

(51) Int. Cl.
*H04B 7/06* (2006.01)
(52) U.S. Cl.
CPC ......... *H04B 7/0617* (2013.01); *H04B 7/0639* (2013.01)
(58) Field of Classification Search
CPC .. H04B 7/0617; H04B 7/0639; H04B 1/0483; H04B 1/0475; H04B 17/12;
(Continued)

(56) References Cited

U.S. PATENT DOCUMENTS

| 2003/0036359 A1* | 2/2003 | Dent ..................... H04B 7/005 455/63.1 |
| 2013/0089159 A1 | 4/2013 | Liu |

(Continued)

FOREIGN PATENT DOCUMENTS

CN    108718205 B    11/2020

OTHER PUBLICATIONS

"Draft TR 38.858 SBFD", 3GPP TSG-RAN4 Meeting # 109, R4-2318925, Agenda: 8.19.1, CMCC, Nov. 13-17, 2023, pp. 1-115.
(Continued)

*Primary Examiner* — Fred A Casca
(74) *Attorney, Agent, or Firm* — Nokia Technologies Oy

(57) ABSTRACT

An apparatus (300), includes multiple sector antennas, each sector antenna of the sector antennas includes a reception array of antenna array elements (215) and a transmission array of antenna array elements (205), and wherein each sector antenna is configured for transmitting signals to devices (712, 722, 732) within a sector and for receiving signals, using the reception array, from devices within the sector; and processing circuitry configured to transform a downlink beamforming matrix into a transformed downlink beamforming matrix using a closed-form expression, wherein the transformed downlink beamforming matrix is configured to suppress both self-interference and cross-sector interference at individual receiver antenna array elements in a multi-sector antenna arrangement, generate beamformed data symbols based on the transformed downlink beamforming matrix, and deliver the beamformed data symbols associated with the current sector to a downlink transmit antenna included in the multi-sector antenna arrangement.

18 Claims, 19 Drawing Sheets

(58) Field of Classification Search
CPC .......... H04B 2001/0425; H04B 17/104; H04B 7/0695; H04B 7/088; H04B 7/10; H04W 16/28; H04L 27/367

See application file for complete search history.

(56) References Cited

U.S. PATENT DOCUMENTS

| | | | |
|---|---|---|---|
| 2020/0169332 | A1 | 5/2020 | Tervo et al. |
| 2020/0212984 | A1* | 7/2020 | Fellhauer ............. H04B 7/0617 |
| 2023/0179382 | A1 | 6/2023 | Ibrahim et al. |
| 2023/0361818 | A1 | 11/2023 | Choi et al. |
| 2024/0259080 | A1 | 8/2024 | Malkov |

OTHER PUBLICATIONS

"Topic summary for [106bis-e][306] FS_NR_duplex_evo_Part1", 3GPP TSG-RAN WG4 Meeting #106bis-e, R4-2305976, Agenda: 5.20.4, Samsung, Apr. 17-26, 2023, 108 pages.

Muta et al., "Adaptive Predistortion Linearization Based on Orthogonal Polynomial Expansion for Nonlinear Power Amplifiers in OFDM Systems", International Conference on Communications and Signal Processing, Feb. 10-12, 2011, pp. 512-516.

"SBFD gNB Radio and antenna considerations", TSG-RAN Working Group 4 (Radio) meeting #104-bis-E, R4-2216404, Agenda: 6.17.2.2.1, Ericsson, Oct. 10-19, 2022, pp. 1-37.

Kolodziej et al., "In-Band Full-Duplex Technology: Techniques and Systems Survey", IEEE Transactions on Microwave Theory and Techniques, vol. 67, No. 07, Jul. 2019, pp. 3025-3041.

Everett et al., "SoftNull: Many-Antenna Full-Duplex Wireless via Digital Beamforming", IEEE Transactions on Wireless Communications, vol. 15, No. 12, Dec. 2016, pp. 8077-8092.

Bliss et al., "Simultaneous Transmission and Reception for Improved Wireless Network Performance", IEEE/SP 14th Workshop on Statistical Signal Processing, Aug. 26-29, 2007, pp. 478-482.

"Feasibility and techniques for Subband non-overlapping full duplex", 3GPP TSG RAN WG1 #109-e, R1-2205031, Agenda: 9.1.3.1, Qualcomm Incorporated, May 9-20, 2022, pp. 1-20.

"RF considerations of dynamic TDD and SBFD", 3GPP TSG RAN WG1 #109, R1-2204433, Agenda: 9.3.4, Nokia, May 9-20, 2022, 12 pages.

Patent Cooperation Treaty Application No. PCT/EP2024/071847, "Self-And Cross-Sector Interference Suppression", filed on Aug. 1, 2024, pp. 1-49.

"3rd Generation Partnership Project; Technical Specification Group Radio Access Network; Study on Evolution of NR Duplex Operation (Release 18)", 3GPP TR 38.858, V2.0.0, Dec. 2023, pp. 1-254.

Office action received for corresponding Finnish Patent Application No. 20245432, dated Sep. 6, 2024, 13 pages.

"Discussion on subband non-overlapping full duplex", 3GPP TSG-RAN WG1 Meeting #109-e, R1-2203157, Agenda: 9.3.2, Huawei, May 9-20, 2022, 9 pages.

"Feasibility and techniques for Subband non-overlapping full duplex", 3GPP TSG RAN WG1, Meeting #110, R1-2207231, Agenda: 9.1.3.1, Qualcomm Incorporated, Aug. 22-26, 2022, pp. 1-28.

"3rd Generation Partnership Project; Technical Specification Group Radio Access Network; NG-RAN; Architecture description (Release 18)", 3GPP TS 38.401, V18.1.0, Mar. 2024, pp. 1-157.

Office action received for corresponding Finnish Patent Application No. 20245432, dated Feb. 27, 2025, 5 pages.

Extended European Search Report received for corresponding European Patent Application No. 25166605.3, dated Aug. 4, 2025, 15 pages.

* cited by examiner

BEAM NULLING METHOD FOR CROSS-SECTOR INTERFERENCE SUPPRESSION

RELATED APPLICATION

This application claims benefit of priority from Finnish Patent App. No. 20245432, filed Apr. 8, 2024, the disclosure of which is hereby incorporated in its entirety by reference herein.

TECHNICAL FIELD

This application relates generally to wireless communication systems, and more particularly to communication systems employing beam nulling.

BACKGROUND

Wireless communications often employ multiple transmit (TX) and receive (RX) antenna array elements. In some cases, multiple antennas, each of which includes multiple antenna array elements, are arranged to serve multiple sectors. Systems employing subband non-overlapping full duplex (SBFD) techniques have been proposed. Interference created by a TX antenna included in a first sector during DL transmissions may interfere with reception of UL transmission by a RX antenna also included in the first sector. This same-sector interference is referred to as self-interference. Cross-sector interference refers to interference created by a TX antenna included in a different sector than the receiving antenna. Self-interference and cross-sector interference adversely impact communications in systems employing SBFD techniques, and in other wireless communications systems.

Attempts have been made to address self-interference and cross-interference using iterative, non-closed-form beam nulling algorithms. But if more than one iteration is needed, these iterative techniques may require multiple teraflops of computing power to implement. For example, for a 100 MHz bandwidth and 30 kHz subcarrier spacing, assuming 3276 active subcarriers, 80% of which is used for downlink (DL) sub-band, 64 DL and 64 uplink (UL) antenna ports, it would require at least nine teraflops of computing power to implement 10 iterations of a non-closed form algorithm in real time.

Pre-distorted data symbols generated using lookup tables (LUT) have been used in conjunction with beam nulling. But LUT predistortion techniques may not be practical because of their huge memory requirements. For example, assuming 3 sectors, 64 beams, a single stream, and 64 QAM modulation, LUT predistortion would require at least 412 GB of memory.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

In various example embodiments, both self-interference and cross-sector interference are suppressed in the transmit (TX) subband via TX beam nulling. In various example embodiments, both self-interference and cross-sector interference are suppressed, because cross-sector interference may become dominant if beam nulling suppresses only self-interference. In some such example embodiments, it may be beneficial to apply TX beam nulling for joint mitigation of self- and cross-sector interference. In at least some example embodiments, a closed-form beam-nulling algorithm is used to suppress both self-interference and cross-sector interference.

In some example embodiments, a DL beamforming matrix, which does not account for self-interference and cross-sector interference, is converted into a transformed beamforming matrix, which suppresses the self-interference and cross-sector interference at each RX antenna array element. Additionally, some example embodiments do not separately modify a beamforming matrix for each subcarrier. Instead, one modified beamforming matrix is used for several subcarriers, further reducing complexity.

But beam nulling alone may cause distortion of the transmitted data symbols. It is possible to ignore this effect if beam nulling is used only for suppression of self-interference, because demodulated reference signals (DMRSs), which are beamformed by the same beamforming vector as the data symbols, would experience the same distortion as the data symbols, allowing the receiver to compensate for the distortion caused by the beam nulling. But if beam nulling is used for joint self and cross-sector interference suppression, the distortion becomes dependent on the beamforming vectors and data symbols in neighboring sectors. In this case, DMRS(s) and data symbols may experience different distortion, and the receiver may not be able to compensate for the distortion caused by the beam nulling.

In various example embodiments, pre-distorted data symbols are input to the closed-form beam-nulling algorithm to pre-compensate for distortion of the data symbols caused by beam nulling. In some example embodiments, the symbols may be pre-distorted using a closed form expression.

In various example embodiments, an apparatus, includes multiple sector antennas associated with sectors, each sector antenna of the sector antennas includes a reception array of antenna array elements and a transmission array of antenna array elements, and wherein each sector antenna is configured for transmitting signals, using the transmission array, to devices within a sector of the sectors that is associated with the sector antenna and for receiving signals, using the reception array, from devices within the sector; and processing circuitry configured to transform a downlink (DL) beamforming matrix into a transformed DL beamforming matrix using a closed-form expression, wherein the transformed DL beamforming matrix is configured to suppress both self-interference and cross-sector interference at individual receiver antenna array elements in a multi-sector antenna arrangement, generate beamformed data symbols associated with a current sector based on the transformed DL beamforming matrix, and deliver the beamformed data symbols associated with the current sector to a DL transmit (TX) antenna included in the multi-sector antenna arrangement.

In some such example embodiments, the processing circuitry is further configured to generate the beamformed data symbols by applying the transformed DL beamforming matrix to pre-distorted data symbols, wherein the pre-distorted data symbols are addressed to devices associated with different sectors.

In another example embodiment, the processing circuitry is further configured to generate a predistortion matrix, and generate the beamformed data symbols by multiplying together undistorted data symbols, the transformed DL beamforming matrix, and the predistortion matrix, wherein the undistorted data symbols are addressed to devices associated with different sectors.

In any or all of the above example embodiments, the processing circuitry is further configured to generate a plurality of transformed DL beamforming matrices for a plurality of sectors of the multi-sector antenna arrangement, and generate, at a beamforming block, the beamformed data symbols for the plurality of sectors using the plurality of transformed DL beamforming matrices.

In some example embodiments, the processing circuitry is further configured to determine an interference channel covariance matrix, wherein the interference channel covariance matrix describes a covariance among interference channels between individual transmit antenna array elements and individual receive antenna array elements of the multi-sector antenna arrangement; and to transform the DL beamforming matrix into the transformed DL beamforming matrix based on a matrix polynomial generated based on the interference channel covariance matrix, wherein the matrix polynomial is generated once for a given number of subcarriers, and wherein the given number of subcarriers is determined based, at least in part, on a signal bandwidth, a subband size, and a variability of the interference channel covariance matrix.

In various example embodiments, the processing circuitry is further configured to transform the DL beamforming matrix into the transformed DL beamforming matrix based on a predistortion matrix, wherein the predistortion matrix is generated based in part on the matrix polynomial, and may transform the DL beamforming matrix into the transformed DL beamforming matrix based on an inverse predistortion matrix, wherein the inverse predistortion matrix is generated once for the given number of subcarriers.

In any of the above example embodiments, the processing circuitry is further configured to generate the beamformed data symbols on a per-subcarrier basis. In some or all of the above example embodiments, the processing circuitry is further configured to generate the beamformed data symbols for a subcarrier over all sectors of the multi-sector antenna arrangement. The processing circuitry may also be configured to generate the beamformed data symbols for a subcarrier over a sector of the multi-sector antenna arrangement.

In various example embodiments, including any or all of the above example embodiments, a base station distributed unit (DU) includes processing circuitry configured to transform a downlink (DL) beamforming matrix into a transformed DL beamforming matrix using a first closed-form expression, wherein the transformed DL beamforming matrix is configured to suppress both self-interference and cross-sector interference at individual receiver antenna array elements in a multi-sector antenna arrangement, and transmit the transformed DL beamforming matrix to a base station radio unit (base station RU) for use in generating beamformed data symbols.

The processing circuitry of the base station DU may be further configured to determine an interference channel covariance matrix, wherein the interference channel covariance matrix describes a covariance among interference channels between individual transmit antenna array elements and individual receive antenna array elements of the multi-sector antenna arrangement. In some such example embodiments, the processing circuitry is further configured to transform the DL beamforming matrix into the transformed DL beamforming matrix based on a matrix polynomial, wherein the matrix polynomial is generated based on an identity matrix and the interference channel covariance matrix, wherein the matrix polynomial is generated once for a given number of subcarriers, wherein the given number of subcarriers is determined based, at least in part, on a signal bandwidth of a carrier frequency.

In some example embodiments, the processing circuitry may be further configured to transform the DL beamforming matrix into the transformed DL beamforming matrix based on a predistortion matrix, wherein the predistortion matrix is generated based in part on the matrix polynomial, and/or transform the DL beamforming matrix into the transformed DL beamforming matrix based on an inverse predistortion matrix, wherein the inverse predistortion matrix is generated once for the given number of subcarriers.

In various example embodiments, a base station radio unit (base station RU) includes processing circuitry configured to generate beamformed data symbols based on a transformed DL beamforming matrix and data symbols addressed to devices associated with different sectors, wherein the transformed DL beamforming matrix is configured to suppress both self-interference and cross-sector interference at individual receiver antenna array elements in a multi-sector antenna arrangement, and deliver the beamformed data symbols to a DL transmit (TX) antenna included in the multi-sector antenna arrangement.

In various example embodiments, the base station RU may receive the transformed DL beamforming matrix from a base station distributed unit (base station DU), or generate the transformed DL beamforming matrix by transforming a DL beamforming matrix into a transformed DL beamforming matrix using a first closed-form expression.

In some example embodiments, the processing circuitry of the RU is further configured to receive, from the base station DU, a plurality of transformed DL beamforming matrices for a plurality of sectors of the multi-sector antenna arrangement, or generate the plurality of transformed DL beamforming matrices, and generate the beamformed data symbols for the plurality of sectors using the plurality of transformed DL beamforming matrices.

In various example embodiments, the processing circuitry is further configured to receive a transformed DL beamforming matrix for an individual sector of the multi-sector antenna arrangement from the base station DU, or generate the transformed DL beamforming matrix for the individual sector, and generate the beamformed data symbols for the individual sector of the multi-sector antenna arrangement using the transformed DL beamforming matrix.

In some example embodiments, the processing circuitry of the base station RU is further configured to generate the beamformed data symbols for a particular subcarrier over all sectors of the multi-sector antenna arrangement. In yet further example embodiments, the processing circuitry is further configured to generate the beamformed data symbols for a particular subcarrier over a sector of the multi-sector antenna arrangement.

Any or all of the above example embodiments, and other example embodiments disclosed herein, may be used in various combinations.

BRIEF DESCRIPTION OF THE DRAWINGS

Example embodiments will become more fully understood from the detailed description given herein below and the accompanying drawings, wherein like elements are represented by like reference numerals. The example embodiments are given by way of illustration only, and thus are not limiting of this disclosure.

It should be noted that these figures are intended to illustrate general characteristics of methods, structure and/or materials utilized in certain example embodiments, and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and combinations, and should not be construed as limited to only the embodiments set forth herein.

Furthermore, it should be understood that there is no intent to limit example embodiments to the particular forms disclosed. On the contrary, example embodiments cover all modifications, equivalents, and alternatives falling within the scope of this disclosure. Like numbers refer to like elements throughout the description of the figures. One or more example embodiments described herein may be combined.

Figure 1:
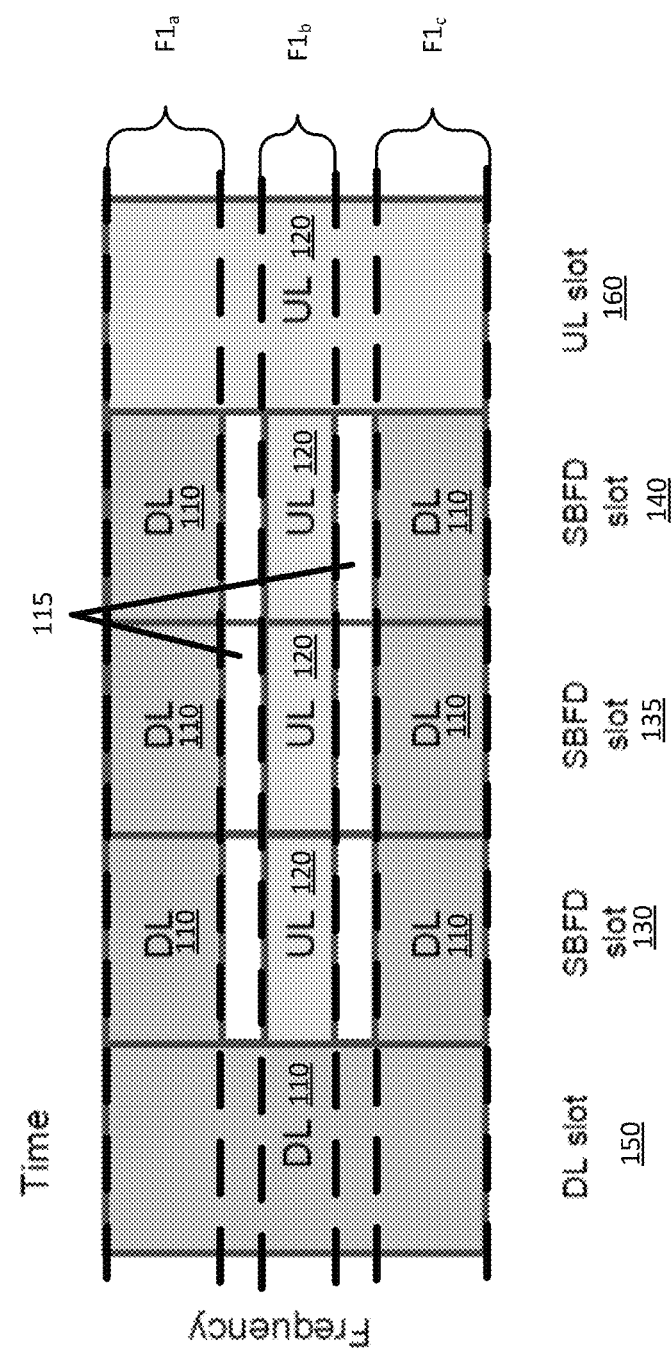
FIG. 1 is a block diagram of a subband non-overlapping full duplex (SBFD) communication channel, in accordance with various example embodiments of the present disclosure.

Referring first to FIG. 1 a subband non-overlapping full duplex (SBFD) communication channel 100 will be discussed in accordance with various example embodiments of the present disclosure.

Various example embodiments employ a subband non-overlapping full duplex (SBFD) technique/protocol, which uses a variation of Time Division Duplexing (TDD) to manage transmissions. In TDD, during all or part of a time slot, transmission is allowed in one of a downlink (DL) or uplink (UL) direction, but not both. In SBFD, transmission is allowed in both DL and UL directions during a time slot. Similar to TDD, SBFD uses one frequency channel, but UL and DL transmission occurs on two or more temporarily or permanently allocated frequency subchannels.

SBFD may improve coverage and reduce latency in comparison to TDD. In some example embodiments, coverage improvement may be realized because the user equipment (UE) has additional uplink transmission opportunities (in terms of time) and therefore can use more energy for uplink (UL) transmission. Latency improvement may be realized because UL transmission opportunities occur more frequently.

In the illustrated example embodiment, SBFD communication channel 100 is divided in time into repeating periods, each of which consists of 5 slots. During DL slot 150, all frequency subbands included in SBFD communication channel 100 may be used for downlink transmissions 110. During UL slot 160 all frequency subbands included in SBFD communication channel 100 may be used for UL transmissions 120. During SBFD slots 130, 135, and 140, frequency subbands $F1_a$ and $F1_c$ may be used for downlink transmissions 110, and frequency subband $F1_b$ may be used for UL transmissions 120. In various example embodiments, guard bands 115 are provided between subbands $F1_b$ and $F1_c$, and between subbands $F1_a$ and $F1_b$. Various example embodiments are not limited to the arrangement shown in FIG. 1. For example, a single UL and single DL subband configuration may also be used.

Figure 2:
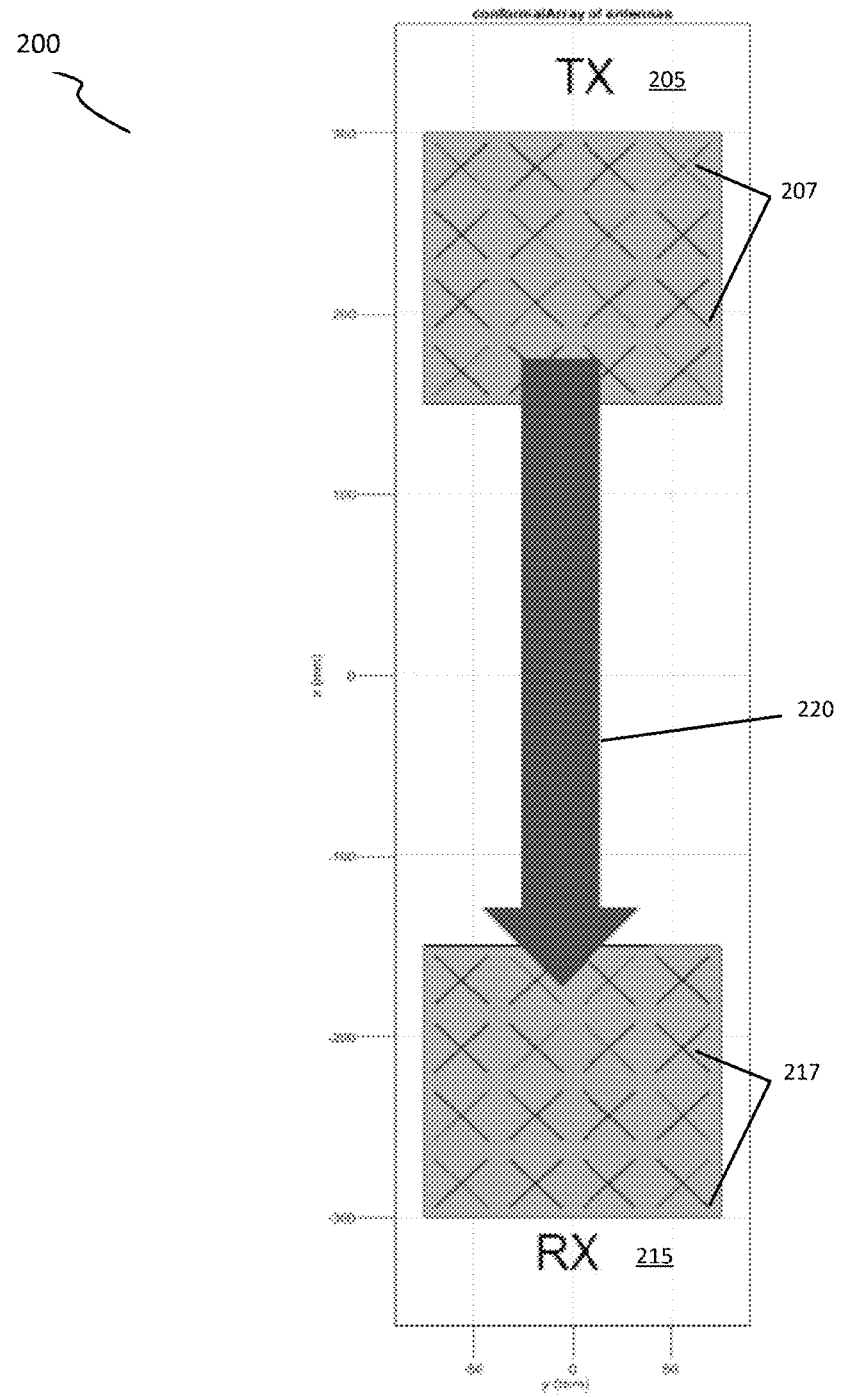
FIG. 2 is a block diagram of a single sector antenna setup illustrating self-interference, in accordance with various example embodiments of the present disclosure.

Referring next to FIG. 2, a single sector antenna setup 200 illustrating self-interference will be discussed in accordance with various example embodiments of the present disclosure. In various example embodiments, single sector antenna setup 200 may include a transmit (TX) antenna 205 including multiple TX antenna array elements 207, and a receive (RX) antenna 215 with multiple RX antenna array elements 217. Recall that when using SBFD, UL and DL transmissions may occur concurrently. In various example embodiments, to make UL reception possible, the base station's receiver may be protected, e.g., isolated, from its own DL transmissions 220. The destination of the DL transmissions is UE, not illustrated in FIG. 2.

In the illustrated example embodiment, self-interference can be observed when DL transmissions 220 generated by TX antenna 205 are received not only by the intended recipient, but also by RX antenna 215. In fact, combined interference from all antenna elements 207 included in TX antenna 205 may be received by every RX antenna element 217, causing saturation of RF circuits and interfering with UL transmissions arriving at RX antenna 215. In various example embodiments, beam nulling techniques described herein may be used to ameliorate this self-interference.

Figure 3:
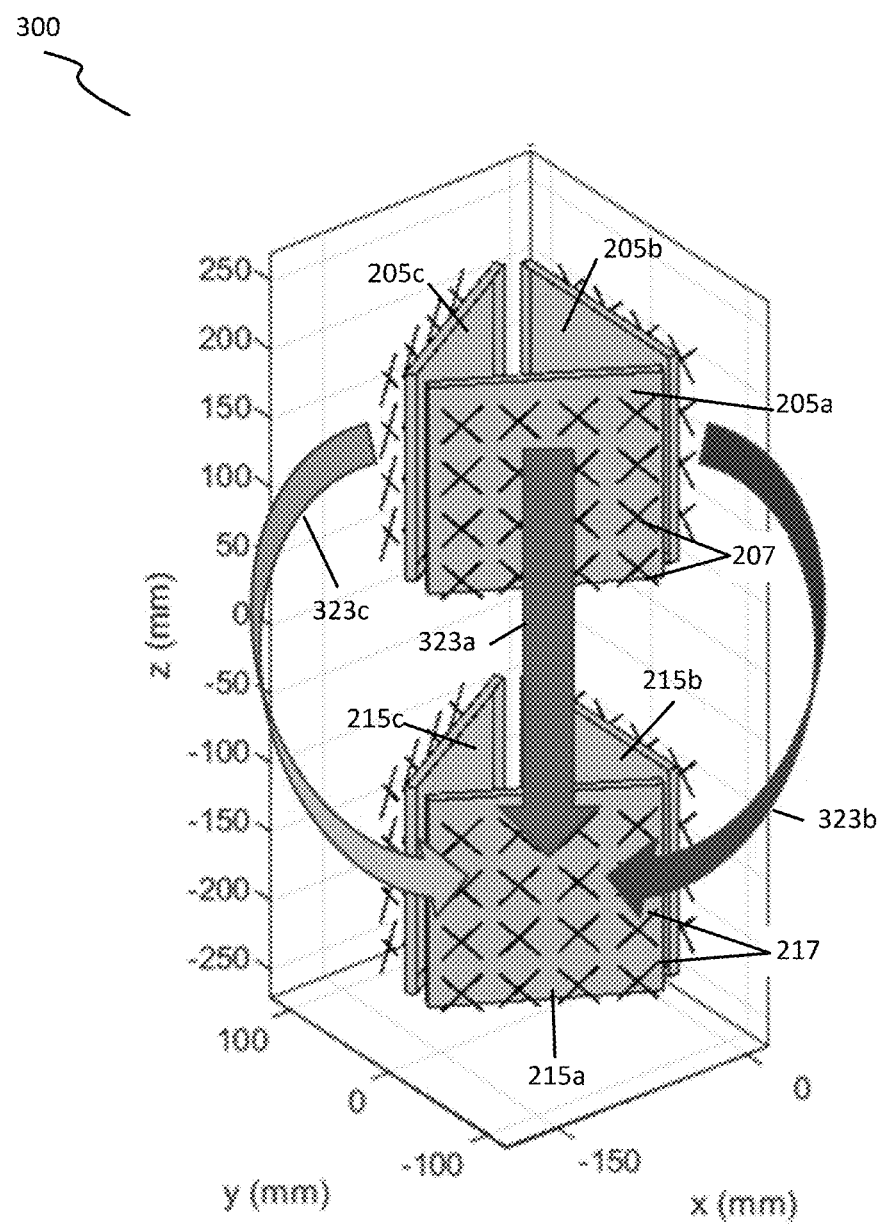
FIG. 3 is a block diagram of a three-sector antenna setup illustrating self-interference and cross interference, in accordance with various example embodiments of the present disclosure.

Referring next to FIG. 3, a block diagram of a three-sector antenna setup 300 illustrating self-interference and cross-sector interference will be discussed in accordance with various example embodiments of the present disclosure. In various example embodiments, three-sector antenna setup 300 may include TX antenna 205a, TX antenna 205b, TX antenna 205c, RX antenna 215a, RX antenna 215b, and RX antenna 215c. TX antenna 205a and RX antenna 215a are associated with a first sector, TX antenna 205b and RX antenna 215b are associated with a second sector, and TX antenna 205c and RX antenna 215c are associated with a third sector.

In contrast to the example embodiment of FIG. 2, where the antenna setup includes only TX and RX antennas associated with a single sector, three-sector antenna setup 300 includes multiple sectors. Each sector's TX antenna interferes not only with the RX antenna in the same sector as the TX antenna, but also with RX antennas in the two neighboring sectors. The following discussion of three-sector antenna setup 300 is from the perspective of the first sector, which includes TX antenna 205a and RX antenna 215a, but the same discussion may apply equally from the perspective of other sectors. Additionally, although three sectors are illustrated and discussed, more or fewer sectors may be included in other example embodiments.

In the illustrated example embodiment, arrow 323a illustrates self-interference within the first sector including TX antenna 205a and RX antenna 215a. Self-interference has been discussed above with respect to FIG. 2. Arrow 323b illustrates interference between TX antenna 205b, which transmits DL signals in the second sector, with RX antenna 215a, which receives UL signals in the first sector. Arrow 323c illustrates interference between TX antenna 205c, which transmits DL signals in the third sector, with RX antenna 215a, which receives UL signals in the first sector. Thus, as illustrated in FIG. 3, RX antenna 215a receives interfering transmission from TX antennas in all three sectors, and is thus affected by both self-interference and cross-sector interference.

In various example embodiments, cross-sector interference occurs due to propagation of side/grating lobes and back lobes between sectors. Isolating the sector antennas from each other may, in some example embodiments, limit cross-channel interference, but the positioning of sector antennas may be limited by site constraints. For example, cross-sector interference isolation may be increased by increasing physical distance between sectors. Additionally or alternatively, cross-sector interference isolation may be increased by adding isolation materials, but the choice of isolation materials may be constrained by factors such as weight, wind-load, weather resistance, or the like.

Those of ordinary skill in the art may consider the terms "cross-sector" and "inter-sector" to be synonymous, but the term "cross-sector" is used herein. In some technical literature, cross-sector interference may be referred to as "Co-site Inter-sector Co-channel Interference" and may be divided into two types: interference in the TX subband and interference in the RX subband.

Figure 4:
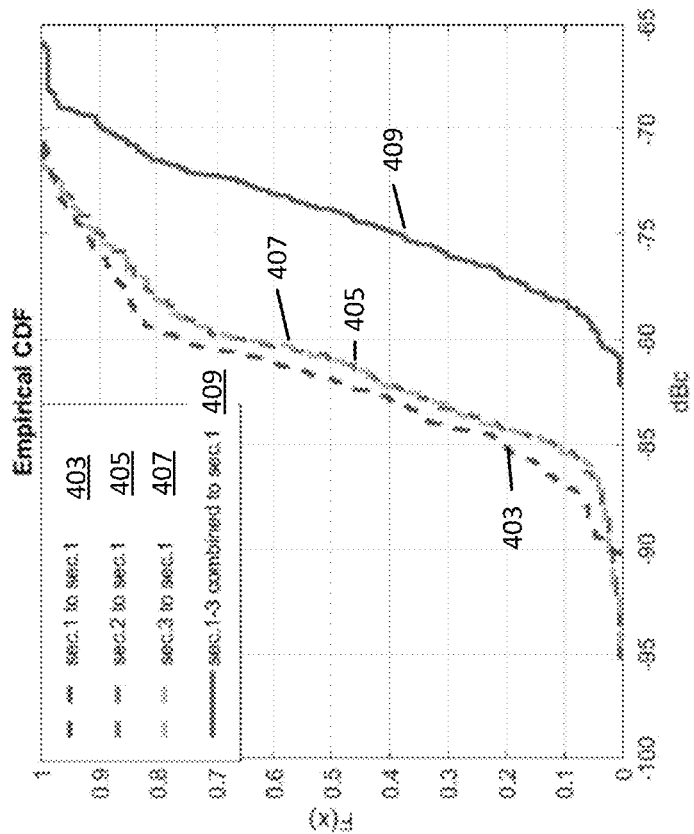
FIG. 4 is a graph illustrating empirical cumulative distribution functions (CDFs), in accordance with various example embodiments of the present disclosure.

Referring next to FIG. 4, a graph 400 of empirical cumulative distribution functions (CDFs) will be discussed in accordance with various example embodiments of the present disclosure. In various example embodiments, because cross-sector interference may become dominant if beam nulling suppresses only self-interference, TX beam nulling may be applied for joint mitigation of self-interference and cross-sector interference.

Graph 400 includes plots 403, 405, 407, and 409, with each plot illustrating empirical CDFs, obtained in simulations. Plot 403 illustrates a CDF of self-interference power at the RX antenna element of sector 1 that is most exposed to self-interference within sector 1. Plot 405 illustrates a CDF of cross-sector interference power at the RX antenna element of sector 1 most exposed to interference from sector 2. Plot 407 illustrates a CDF of cross-sector interference power at the RX antenna element of sector 1 most exposed to interference from sector 3. Plot 409 illustrates a CDF of total (combined) interference power from all three sectors at the most exposed RX antenna element of sector 1. Each sample used for generating an empirical CDF curve differs in beam direction and data symbol. Beam directions were taken within ±45° in azimuth and elevation, data symbols were taken from a quadrature phase shift keyed (QPSK) constellation.

As illustrated by graph 400, for simulated configuration of antenna arrays, CDF curves of self-interference and cross-sector interference are close to each other—generally within 5 dBc, where dBc is the power ratio of an information signal to a carrier signal, expressed in decibels Beam nulling causes distortion of the transmitted data symbols. If beam nulling is used only for suppression of self-interference, the distortion in the transmitted data symbols may be effectively ignored, because demodulation reference signals (DMRS), which may be used by a receiver to recover received data signals, are beamformed by the same beamforming vector used to beamform the data symbols. As a result, DMRS may experience the same distortion as the data symbols, allowing the receiver to compensate for any distortion caused by beam nulling.

In various example embodiments however, when beam nulling is used for joint self-interference and cross-sector interference suppression, then the distortion caused by beamforming may be dependent on the beamforming vectors and data symbols in neighbouring sectors. In this case, DMRS(s) and data symbols may experience different distortion, and legacy receivers may not be able to compensate for the different distortion.

Figure 5:
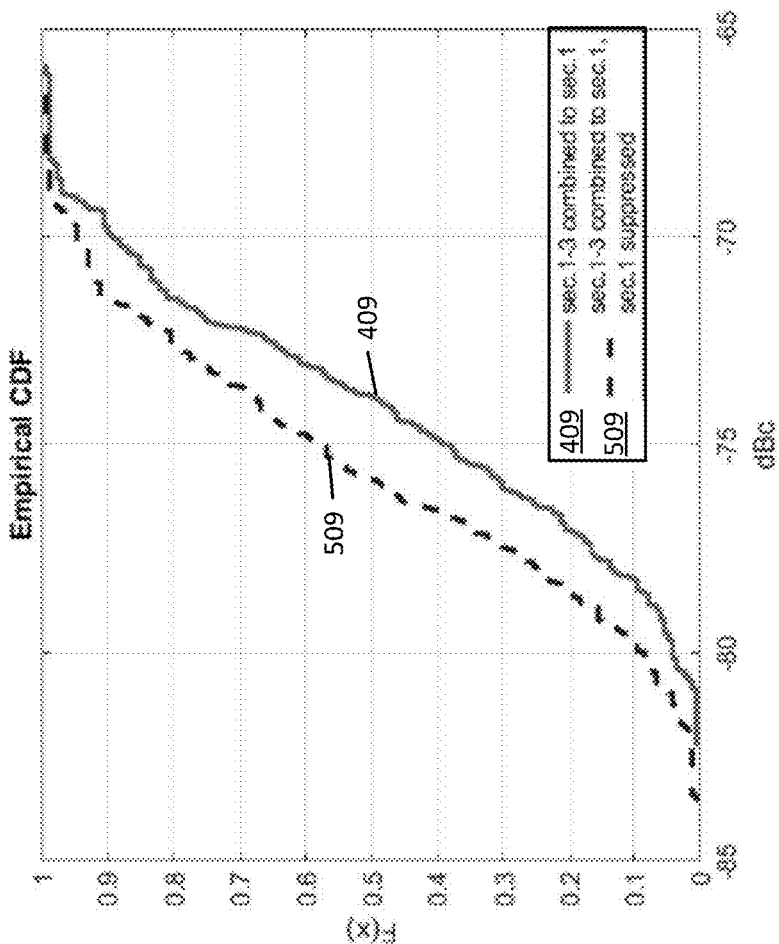
FIG. 5 is another graph illustrating empirical cumulative distribution functions (CDFs), in accordance with various example embodiments of the present disclosure.

Referring next to FIG. 5, another graph 500 illustrating empirical cumulative distribution functions (CDFs) will be discussed in accordance with various example embodiments of the present disclosure.

In the illustrated example embodiment, graph 500, a difference between combined interference power with and without self-interference suppression is illustrated. For example, graph 500 includes plot 409, which illustrates a CDF of total (combined) interference power from all three sectors (self-interference and cross-sector interference from both sector 2 an sector 3) at the most exposed RX antenna element of sector 1. Plot 509 illustrates the CDF of total (combined) interference power from all three sectors, but with self-interference being suppressed. A comparison of plots 409 and 509 reveals that suppressing self-interference alone reduces combined interference only marginally, e.g., by less than 5 dB. Although not illustrated in FIG. 5, a similar effect is observed if only cross-sector interference is suppressed. Various example embodiments employ beam nulling to address both self-interference and cross-channel interference, which may provide improved results compared to suppressing either self-interference or cross-sector interference alone.

Figure 6:
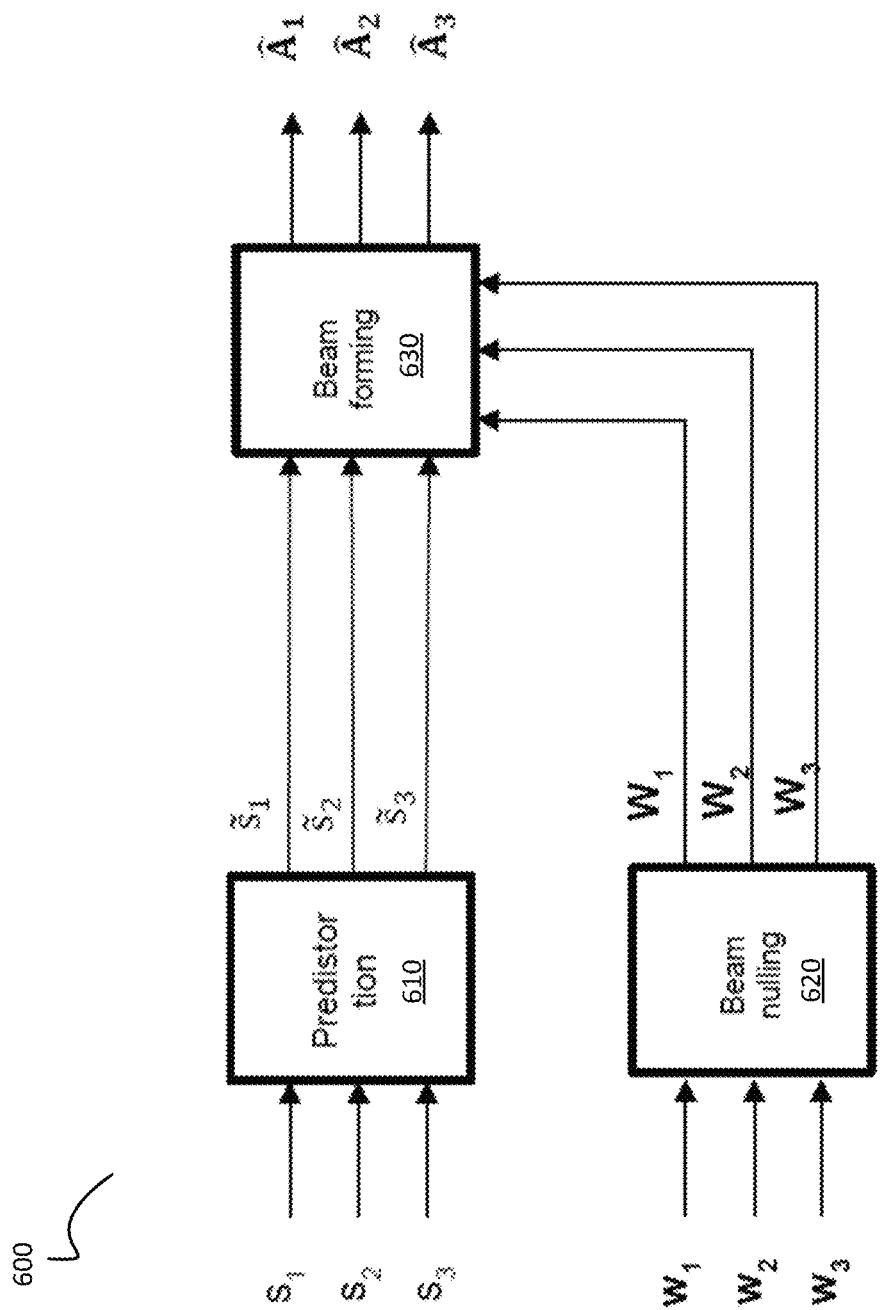
FIG. 6 is a block diagram illustrating a system for centralized generation of beamformed data symbols, in accordance with various example embodiments of the present disclosure.

Referring next to FIG. 6, a system 600 for centralized generation of beamformed data symbols will be discussed in accordance with various example embodiments of the present disclosure. In various example embodiments, a beamformed data symbol is a weight vector comprising weights associated respectively with the antenna array elements of the transmission array of a sector antenna.

System 600 includes predistortion block 610, beam nulling block 620, and beam forming block 630. Any or all of predistortion block 610, beam nulling block 620, and beam forming block 630 may include processing circuitry including, but not limited to, fixed logic circuitry, microprocessors, general purpose processors, graphics processors, special purpose processors, and/or processing systems or subsystems, any or all of which may be specially configured to perform various example embodiments by, for example, executing software/firmware instructions.

In various example embodiments, system 600 may centrally generate beamformed data symbols using one or more techniques disclosed herein to suppress combined self and cross-sector interference in an SBFD system. For example for a 3 sector antenna arrangement, predistortion block 610 may receive undistorted data symbols $s_1$, $s_2$, and $s_3$ as inputs, and generate as outputs pre-distorted data symbols $\tilde{s}_1$, $\tilde{s}_2$, and $\tilde{s}_3$. Beam nulling block 620 may receive as inputs untransformed beamforming matrices $w_1$, $w_2$, and $w_3$, which do not account for self-interference and cross-sector interference, and generate as outputs transformed beamforming matrices $W_1$, $W_2$, and $W_3$, where each transformed beamforming matrix may suppress combined self-interference and cross-sector interference for each RX antenna array element of an RX antenna. The pre-distorted data symbols output by predistortion block 610 and the transformed beamforming matrices output by beam nulling block 620, are delivered as inputs to beam forming block 630, which generates matrices of concatenated beamformed data symbols $\hat{A}_1$, $\hat{A}_2$, and $\hat{A}_3$ for transmission. It will be appreciated that a vector is the special case of a matrix having a single row or column.

In various example embodiments, beam nulling block 620 modifies untransformed beamforming matrices to produce transformed beamforming matrices from using a closed-form expression, which may greatly reduce complexity as compared to iterative beamforming techniques. Furthermore, in various example embodiments, a transformed beamforming matrix is used for several subcarriers, which may provide an additional reduction in complexity.

Additionally, in some example embodiments predistortion block 610 uses a closed form expression to generate the pre-distorted data symbols from the undistorted data symbols. In some example embodiments, using a closed form expression may allow this method to be implemented on available hardware.

The following description describes techniques that can be used in accordance with various example embodiments of beam-nulling that account for combined self-interference and cross-sector interference. In the example embodiments discussed below, a single spatial stream per sector is assumed, but the below example embodiments can be extended to the case of multiple streams per sector.

In the equations presented below: $N_{TX}$ is the number of TX antenna array elements of one sector; $N_{RX}$ is the number of RX antenna array elements of one sector; $N_{SE}$ is the number of sectors; and $C \in \mathbb{C}^{N_{SE}N_{TX} \times N_{SE}N_{TX}}$ is the covariance matrix of the interference channel.

In various example embodiments, beamforming is performed according to equation (1):

$$\hat{A} = Ws \qquad (1)$$

where $\hat{A} \in \mathbb{C}^{N_{SE}N_{TX} \times 1}$ is a vector of concatenated beamformed data symbols defined by equation (2):

$$\hat{A} = \begin{bmatrix} \hat{A}_1 \\ \vdots \\ \hat{A}_{N_{SE}} \end{bmatrix} \qquad (2)$$

where $\hat{A}_k \in \mathbb{C}^{N_{TX} \times 1}$, k=1, ..., $N_{SE}$ is a beamformed data symbol for the sector k.

$s \in \mathbb{C}^{N_{SE} \times 1}$ is a vector of data symbols, $s = [s_1 \ldots s_{N_{SE}}]^T$.

$W \in \mathbb{C}^{N_{SE}N_{TX} \times N_{SE}}$ is a transformed beamforming matrix, which is calculated according to equation (3):

$$W = [B_1 w_1 \ldots B_{N_{SE}} w_{N_{SE}}] \qquad (3)$$

$w_k \in \mathbb{C}^{N_{TX} \times 1}$ is an untransformed beamforming vector, applied in the sector k.

$B_k \in \mathbb{C}^{N_{SE}N_{TX} \times N_{TX}}$, k=1, ..., $N_{SE}$ is a beam nulling matrix, defined in equation (4):

$$B_k = \begin{bmatrix} \hat{B}_{1k} \\ \vdots \\ \hat{B}_{N_{SE}k} \end{bmatrix} \qquad (4)$$

Matrix $B_{lm} \in \mathbb{C}^{N_{TX} \times N_{TX}}$, l=1 ... $N_{SE}$, m=1 ... $N_{SE}$ is an $N_{TX} \times N_{TX}$ submatrix of the matrix B defined by equation (5):

$$B = \begin{bmatrix} B_{11} & \cdots & B_{1N_{SE}} \\ \vdots & \ddots & \vdots \\ B_{N_{SE}1} & \cdots & B_{N_{SE}N_{SE}} \end{bmatrix} \qquad (5)$$

Matrix $B \in \mathbb{C}^{N_{SE}N_{TX} \times N_{SE}N_{TX}}$ is given by matrix polynomial, presented in equation (6), where the first term is an identity matrix and the second term is the covariance matrix of the self- and cross-sector interference channel. $M \in \mathbb{N}$ is a design parameter.

$$B = (1-C)^M \qquad 6$$

A vector $\tilde{s} \in \mathbb{C}^{N_{SE} \times 1}$ of the pre-distorted data symbols is given by equation (7):

$$\tilde{s} = [\tilde{s}_1 \ldots \tilde{s}_{N_{SE}}]^T \quad (7)$$

This vector can be obtained by solving linear equation (8):

$$D\tilde{s} = s \quad (8)$$

Matrix $D \in \mathbb{C}^{N_{SE} \times N_{SE}}$ is a predistortion matrix defined by equation (9):

$$D = \begin{bmatrix} w_1^* B_{11} \vec{h}_1 & \ldots & w_1^* B_{1N_{SE}} \vec{h}_{N_{SE}} \\ \vdots & \ddots & \vdots \\ w_{N_{SE}}^* B_{N_{SE}1} \vec{h}_1 & \ldots & w_{N_{SE}}^* B_{N_{SE}N_{SE}} \vec{h}_{N_{SE}} \end{bmatrix} \quad (9)$$

Matrix $B_{lm}$ is given in equation (5).

Vector $\vec{h}_l \in \mathbb{C}^{N_{TX} \times 1}, l=1 \ldots N_{SE}$ is a far-field channel vector of the sector $l$ and $s \in \mathbb{C}^{N_{SE} \times 1}$ is a vector of the data symbols.

In various example embodiments, the predistortion block 610 may calculate a matrix/vector of the pre-distorted symbols $\tilde{s}$ by solving equation (8). In some such example embodiments, equation (8) is solved once for each subcarrier. However, the predistortion matrix D, which is independent on the data symbol vector s, may be updated less frequently.

To calculate the predistortion matrix D the predistortion block 610 may obtain submatrices $B_{lm}$ of the matrix B. Matrix B may be calculated according to equation (6).

As noted previously, $C \in \mathbb{C}^{N_{SE}N_{TX} \times N_{SE}N_{TX}}$ is an interference channel covariance matrix. In some example embodiments, matrix C may be calculated using equation (10):

$$C = H(H)H \quad (10)$$

Matrix $H \in \mathbb{C}^{N_{SE}N_{TX} \times N_{SE}N_{RX}}$, which is defined by equation (11), is a channel matrix representing self- and cross-sector interference channel in DL subband at a certain subcarrier:

$$H = \begin{bmatrix} h_{1,1} & \ldots & h_{1,N_{SE}N_{RX}} \\ \ldots & \ddots & \ldots \\ h_{N_{SE}N_{TX},1} & \ldots & h_{N_{SE}N_{TX},N_{SE}N_{TX}} \end{bmatrix} \quad (11)$$

Each matrix element $h_{i,j}$ represents an interference channel between TX antenna element i and RX antenna element j. Note that TX antenna element i and RX antenna element j may belong to the same or to different sectors. In the first case $h_{i,j}$ is the self-interference channel, in the second case it is the cross-sector interference channel.

Beam nulling 620 calculates the transformed beamforming matrix $W_k \in \mathbb{C}^{N_{TX} \times N_{SE}}$, k=1, . . . , $N_{SE}$, which is a submatrix of W defined by equation (12):

$$W = \begin{bmatrix} W_1 \\ \vdots \\ W_{N_{SE}} \end{bmatrix} \quad (12)$$

Figure 7:
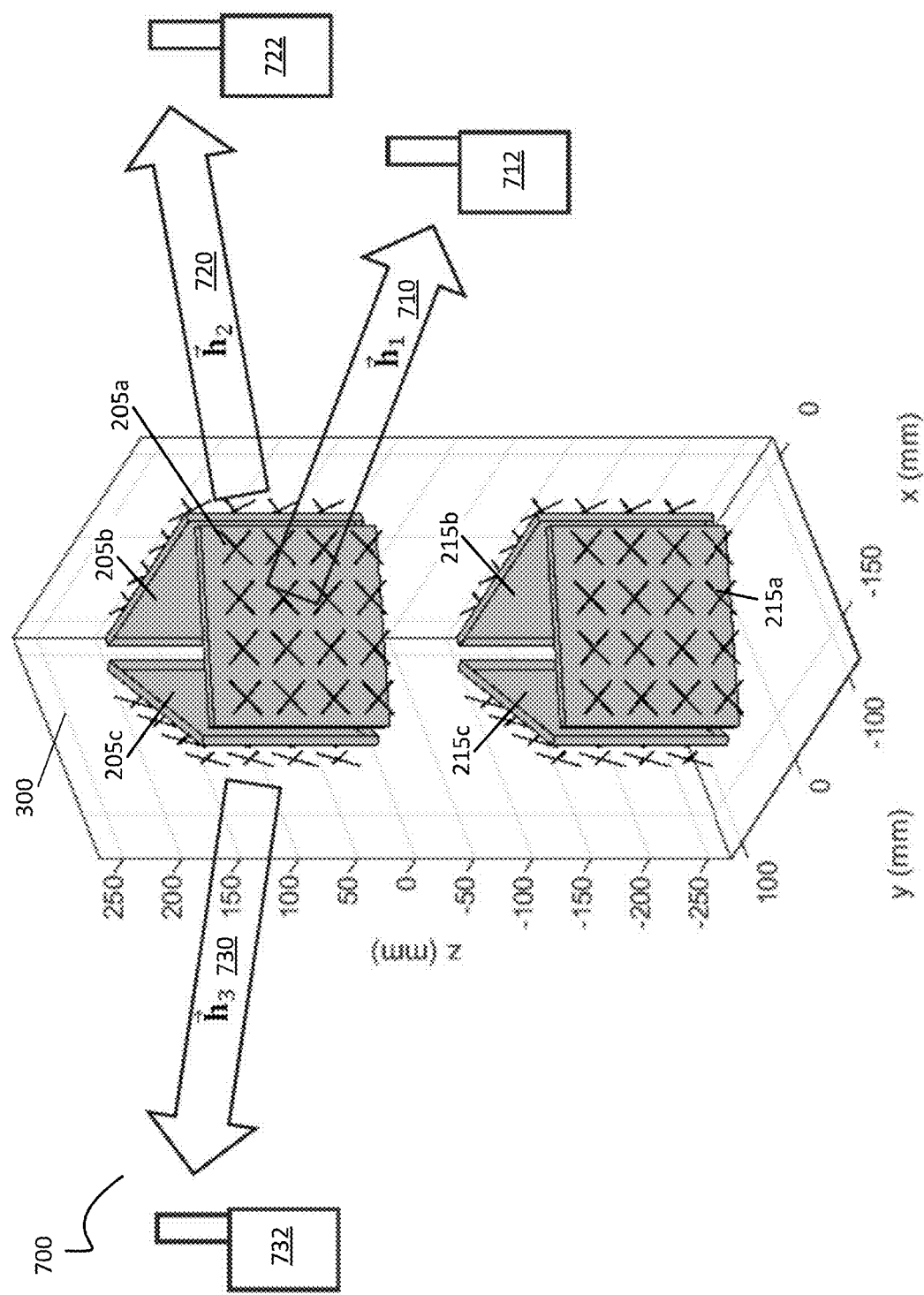
FIG. 7 is a block diagram of a system illustrating far-field channels, in accordance with various example embodiments of the present disclosure.

Referring next to FIG. 7, a system 700 illustrating far-field channels will be discussed in accordance with various example embodiments of the present disclosure. In various example embodiments, system 700 includes the three-sector antenna setup 300 as discussed with reference to FIG. 3, mobile device 712 attached to a first sector including TX antenna 205a and RX antenna 215a, mobile device 722 attached to a second sector including TX antenna 205b and RX antenna 215b, and mobile device 732 attached to via a third sector including TX antenna 205c and RX antenna 215c.

A first far-field TX channel vector representing first sector DL communications between TX antenna 205a and mobile device 712 is illustrated as $\vec{h}_1$ 710; a second far-field TX channel vector representing second sector DL communications between TX antenna 205b and mobile device 722 is illustrated as $\vec{h}_2$ 720; and a third far-field TX channel vector representing third sector DL communications between TX antenna 205c and mobile device 732 is illustrated as $\vec{h}_3$ 730.

In various example embodiments, vector $\vec{h}_l \in \mathbb{C}^{N_{TX}}, l=1 \ldots N_{SE}$ is a far-field channel vector in the sector 1. Each element of this vector represents a channel between one TX antenna element of a base station (BS) antenna array such as three-sector antenna setup 300, and a RX antenna of the UE, attached to the sector 1.

In some example embodiments, $\vec{h}_l$ may be estimated. In some such example embodiments, the best estimate of $\vec{h}_l$ available at a transmitter, e.g., a gNodeB (gNB), is equal to the conjugate of $w_l$. In that case the predistortion matrix D may be calculated according to equation (13):

$$D = \begin{bmatrix} w_1^* B_{11}(w_1^*)^T & \ldots & w_1^* B_{1N_{SE}} \cdot (w_{N_{SE}}^*)^T \\ \vdots & \ddots & \vdots \\ w_{N_{SE}}^* B_{N_{SE}1}(w_1^*)^T & \ldots & w_{N_{SE}}^* B_{N_{SE}N_{SE}}(w_{N_{SE}}^*)^T \end{bmatrix} \quad (13)$$

The pre-distorted data symbols may be calculated according to equation (14):

$$\tilde{s} = D^{-1} s \quad (14)$$

In various example embodiments, the inverse matrix $D^{-1}$ is not calculated for each subcarrier, but for a group of subcarriers for which the matrix D is unchanged. However, in some example embodiments, the product of $D^{-1}$ and the vector s are calculated for each subcarrier, because the vector s is different for each subcarrier. The complexity of this multiplication is relatively small, since the matrix dimension is $N_{SE} \times N_{SE}$.

The scalar value M in equation (6) is a parameter that may be used to determine the level of interference suppression. A higher suppression level may correspond to a larger M value.

In some example embodiments, calculating the matrix B using equation (6) requires calculating the M-th power of the matrix (1−C). The complexity of this calculation is relatively high because the matrix dimension is $N_{SE}N_{TX} \times N_{SE}N_{TX}$. However, in various example embodiments the matrix B is not calculated for each subcarrier, but for a group of subcarriers for which the matrix C is unchanged.

Figure 8:
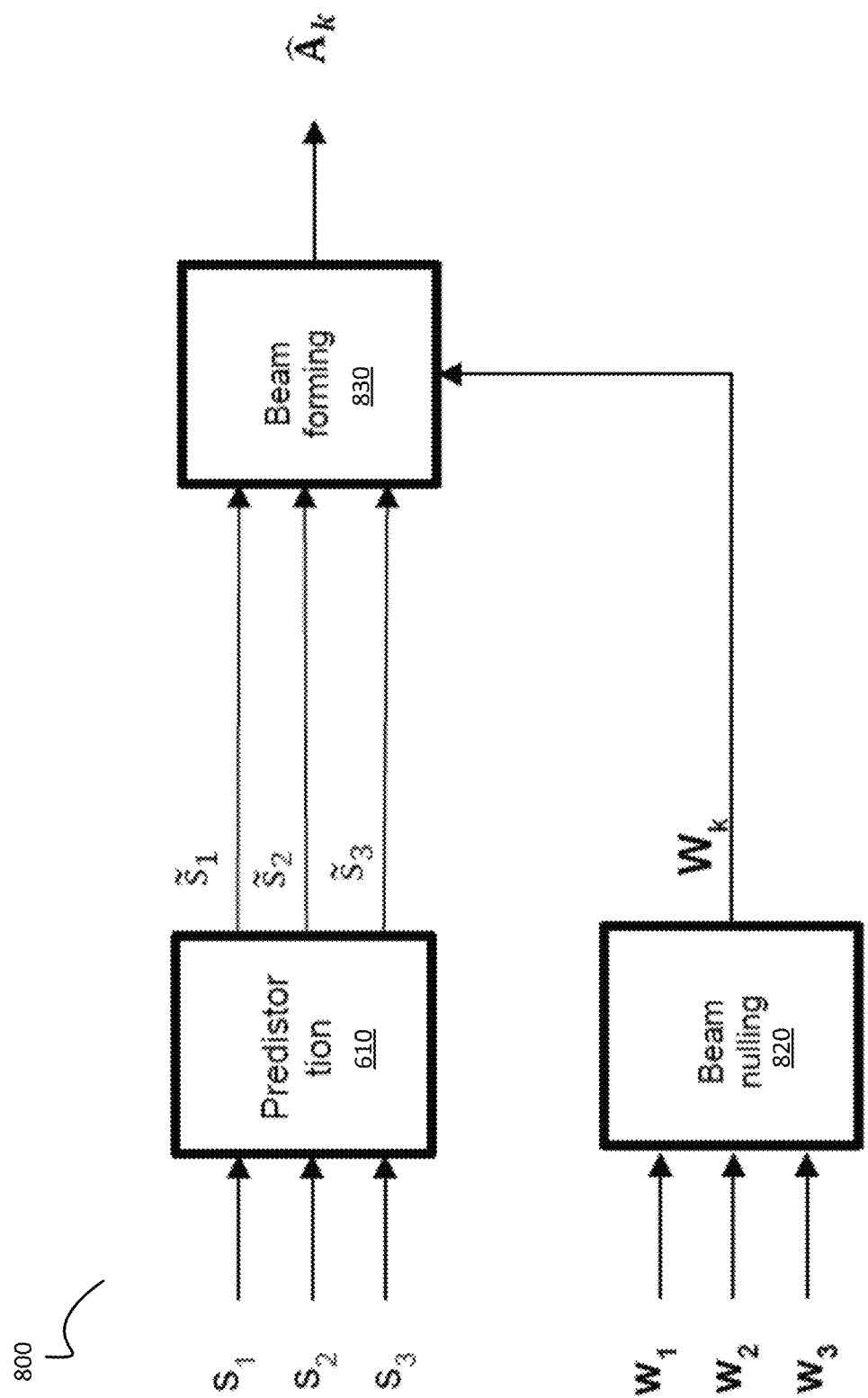
FIG. 8 is a block diagram illustrating a system for distributed generation of beamformed data symbols, in accordance with various example embodiments of the present disclosure.

Referring next to FIG. 8, a system 800 for distributed generation of beamformed data symbols will be discussed in accordance with various example embodiments of the present disclosure. In various example embodiments, system 800 may distributedly generate beamformed data symbols using one or more techniques disclosed herein to suppress combined self and cross-sector interference in an SBFD system. Note that system 600 (FIG. 6) may be referred to as a "centralized" system, because a centralized beamforming block 630 (FIG. 6) computes beamformed data symbols for all $N_{SE}$. However, in various example embodiments discussed with reference to FIG. 8, beamforming for each sector may be performed at a separate distributed unit (DU).

In some such example embodiments, one DU performs beamforming for one sector and beamforming block 830 uses only one beamforming matrix. Distributed units (DUs) are discussed in more detail in FIG. 18.

In an example embodiment of system 800 used with a 3-sector antenna arrangement, predistortion block 610 may receive undistorted data symbols $s_1$, $s_2$, and $s_3$ as inputs, and generate as outputs pre-distorted data symbols $\tilde{s}_1$, $\tilde{s}_2$, and $\tilde{s}_3$. Beam nulling block 820 may receive as inputs untransformed beamforming matrices $w_1$, $w_2$, and $w_3$, which do not account for self-interference and cross-sector interference, and generate as outputs transformed beamforming matrices $W_k$, where $W_k \in \mathbb{C}^{N_{TX} \times N_{SE}}$, $k=1, \ldots, N_{SE}$, and is a submatrix of W, equation (13). Transformed beamforming matrices $W_k$ may suppress combined self-interference and cross-sector interference for each RX antenna array element of an RX antenna.

The pre-distorted data symbols output by predistortion block 610 and one of the transformed beamforming matrices output by beam nulling block 820, are delivered as inputs to beam forming block 830, which generates a matrix of concatenated beamformed data symbols $\hat{A}_k$ for transmission. Further details of the operation of example embodiments of system 800 are discussed subsequently with respect to FIG. 15.

Figure 9:
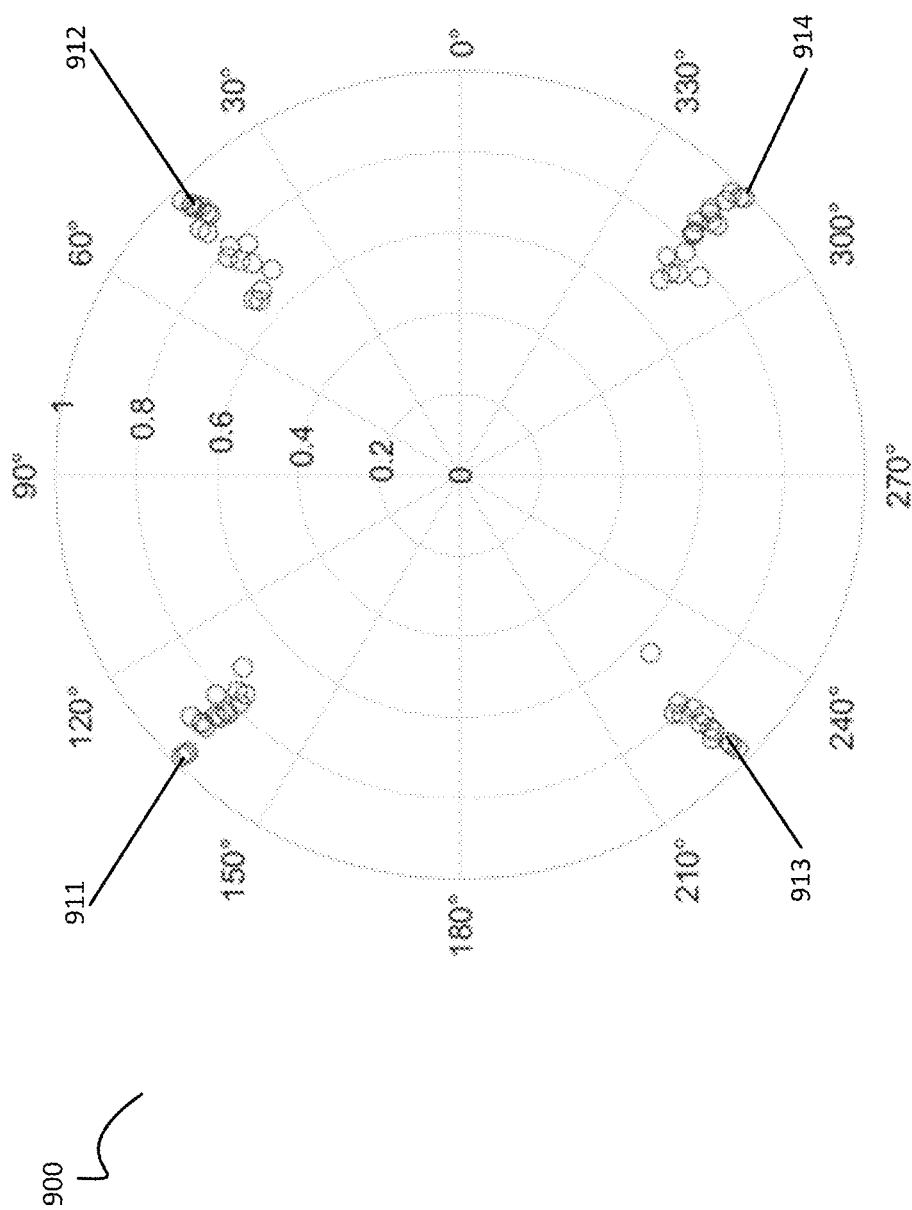
FIG. 9 is a constellation diagram illustrating quadrature phase shift keyed (QPSK) symbols after beam nulling without symbol pre-distortion, in accordance with various example embodiments of the present disclosure.

Referring next to FIG. 9, a constellation diagram 900 will be discussed in accordance with various example embodiments of the present disclosure. As illustrated by FIG. 9, quadrature phase shift keyed (QPSK) data symbols may be distorted when beam nulling is performed without using predistortion. It will be appreciated that beam nulling causes amplitude and phase distortion of the data symbols at the receiver of the UE, and that in multi-sector arrangements, the distortion depends on 1) the data symbol itself; 2) on the data symbols in other sectors; and 3) on the beamforming vectors in all sectors.

FIG. 9 illustrates distortion of a first constellation point of QPSK data symbols 911, distortion of a second constellation point of QPSK data symbols 912, distortion of a third point constellation of QPSK data symbols 913, and distortion of a fourth constellation point of QPSK data symbols 914, as received at user equipment (UE). A different subcarrier was used to generate each of the constellation points, but the same beamforming vector is applied to all subcarriers in question. The different distortion may be attributed solely to the fact that the data symbols in neighboring sectors are different.

It will be appreciated that in new radio (NR), long term evolution (LTE), and similar communication systems, demodulation of data symbols is assisted by pilot symbols, e.g., demodulation reference signals (DMRS) or cell-specific reference signals (CRS). Using the pilot symbols, a receiver can estimate the amplitude and phase offset of the received data symbols. It is assumed in such cases that the amplitude and phase offset caused, for example, by the propagation channel, is independent of the transmitted data. Thus, some UE receivers may not be able to compensate for the distortion illustrated in constellation diagram 900

Figure 10:
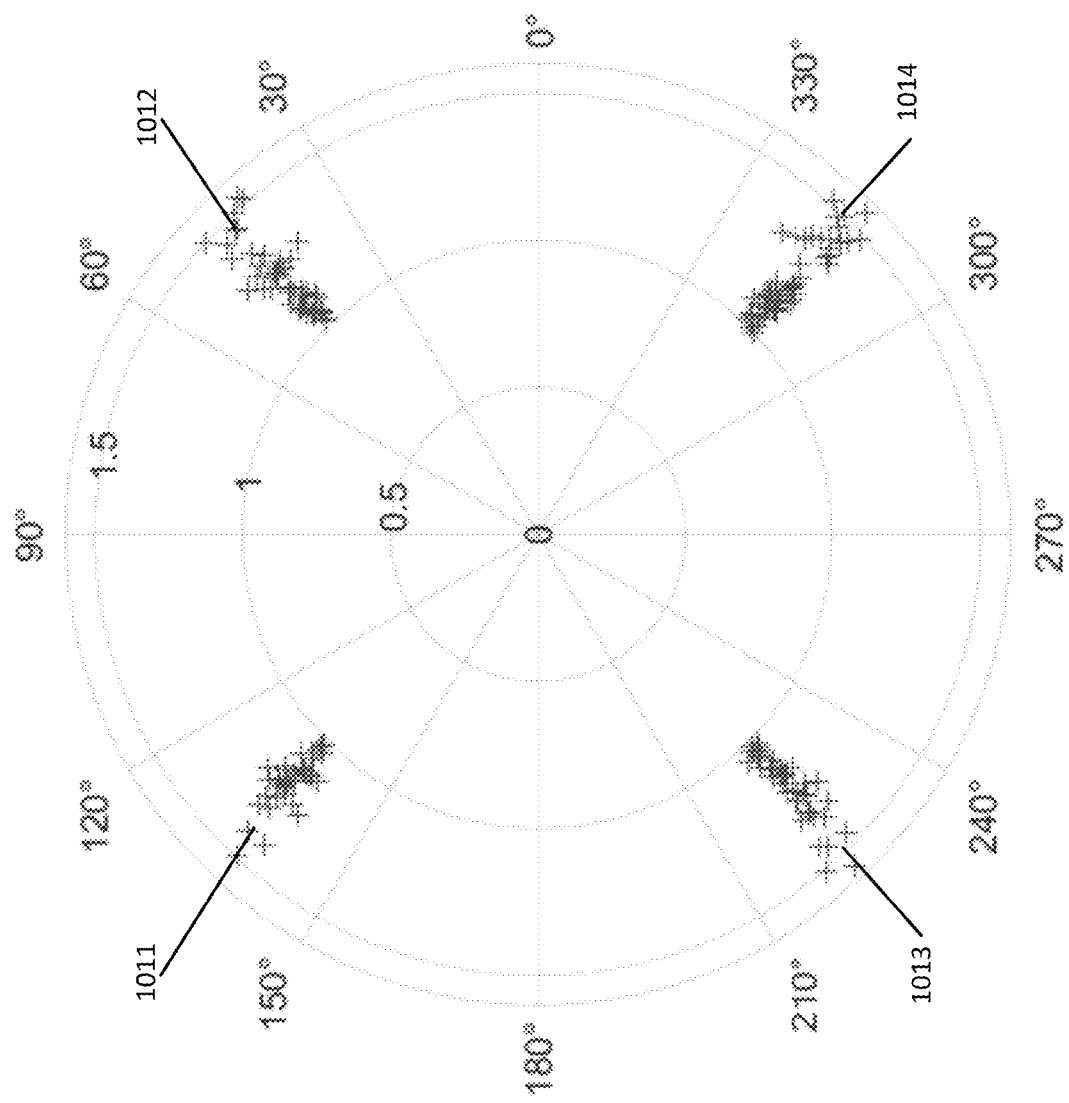
FIG. 10 is a constellation diagram illustrating pre-distorted QPSK symbols, in accordance with various example embodiments of the present disclosure.

Referring next to FIG. 10, a constellation diagram 1000 will be discussed in accordance with various example embodiments of the present disclosure. Various example embodiments may account for the distortion caused by different combinations of data symbols, as illustrated by constellation diagram 900 (FIG. 9), by using a predistortion unit/block 610 (FIGS. 6 and 8) to convert data symbols $s_l$ into pre-distorted data symbols $\tilde{s}_l$. Constellation diagram 1000 illustrates examples of these pre-distorted symbols.

Constellation diagram 1000 illustrates a first constellation point of pre-distorted QPSK data symbols 1011, a second constellation point of pre-distorted QPSK data symbols 1012, a third constellation point of pre-distorted QPSK data symbols 1013, and a fourth constellation point of pre-distorted QPSK data symbols 1014, prior to beamforming/beam nulling.

Figure 11:
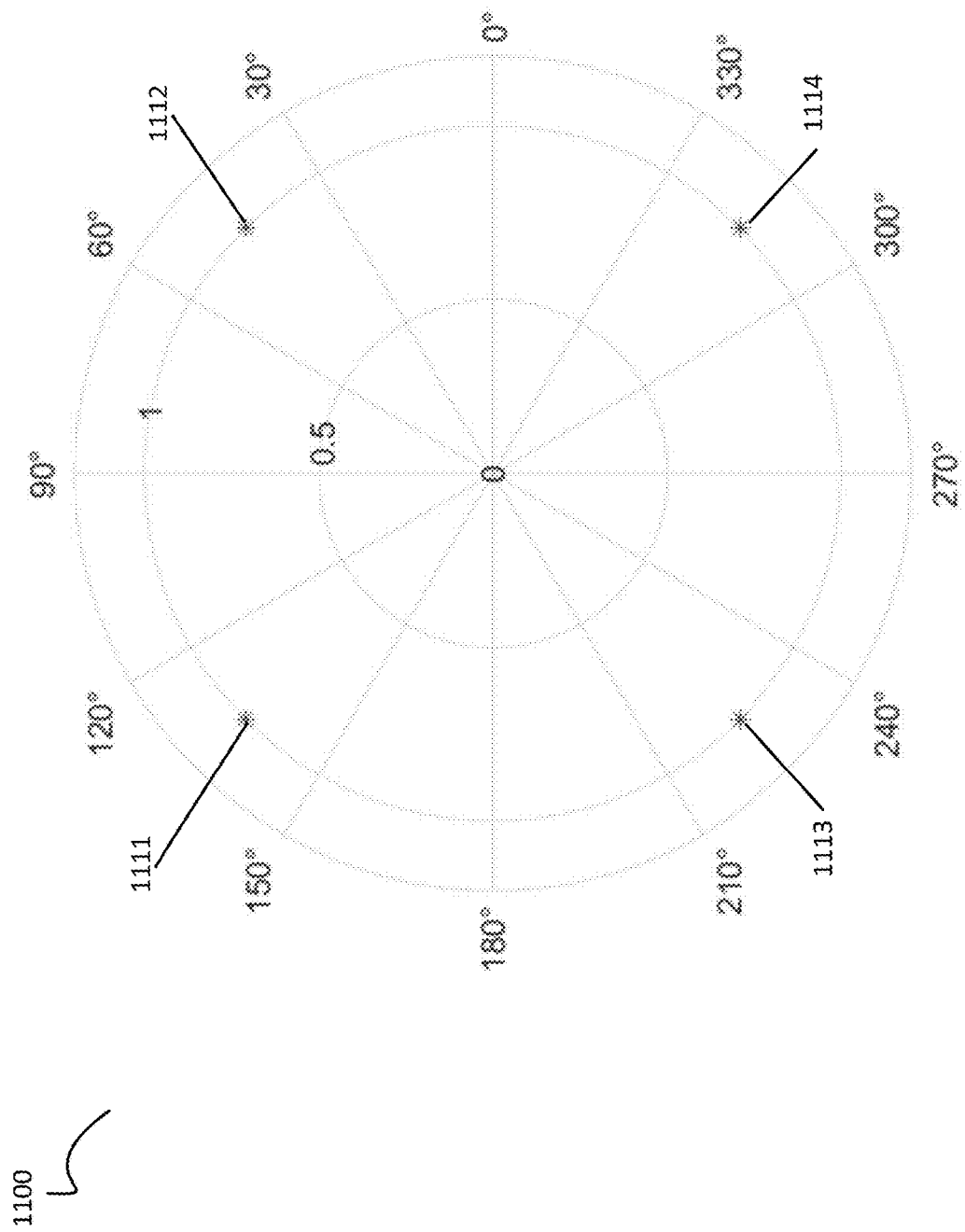
FIG. 11 is a constellation diagram illustrating QPSK symbols after beam nulling with symbol pre-distortion, in accordance with various example embodiments of the present disclosure.

Referring next to FIG. 11, a constellation diagram 1100 will be discussed in accordance with various example embodiments of the present disclosure. In particular, constellation diagram 1100 illustrates QPSK symbols after beam nulling combined with symbol pre-distortion.

Constellation diagram 1100 illustrates a first corrected constellation point of QPSK data symbols 1111, a second corrected constellation point of QPSK data symbols 1112, a third corrected constellation point of QPSK data symbols 1113, and a fourth corrected constellation point of QPSK data symbols 1114, as received by user equipment (UE). A comparison of FIG. 11 with FIG. 9 illustrates improvements in data symbol transmission that may be achieved by employing pre-distortion beam nulling in accordance with various example embodiments.

Figure 12:
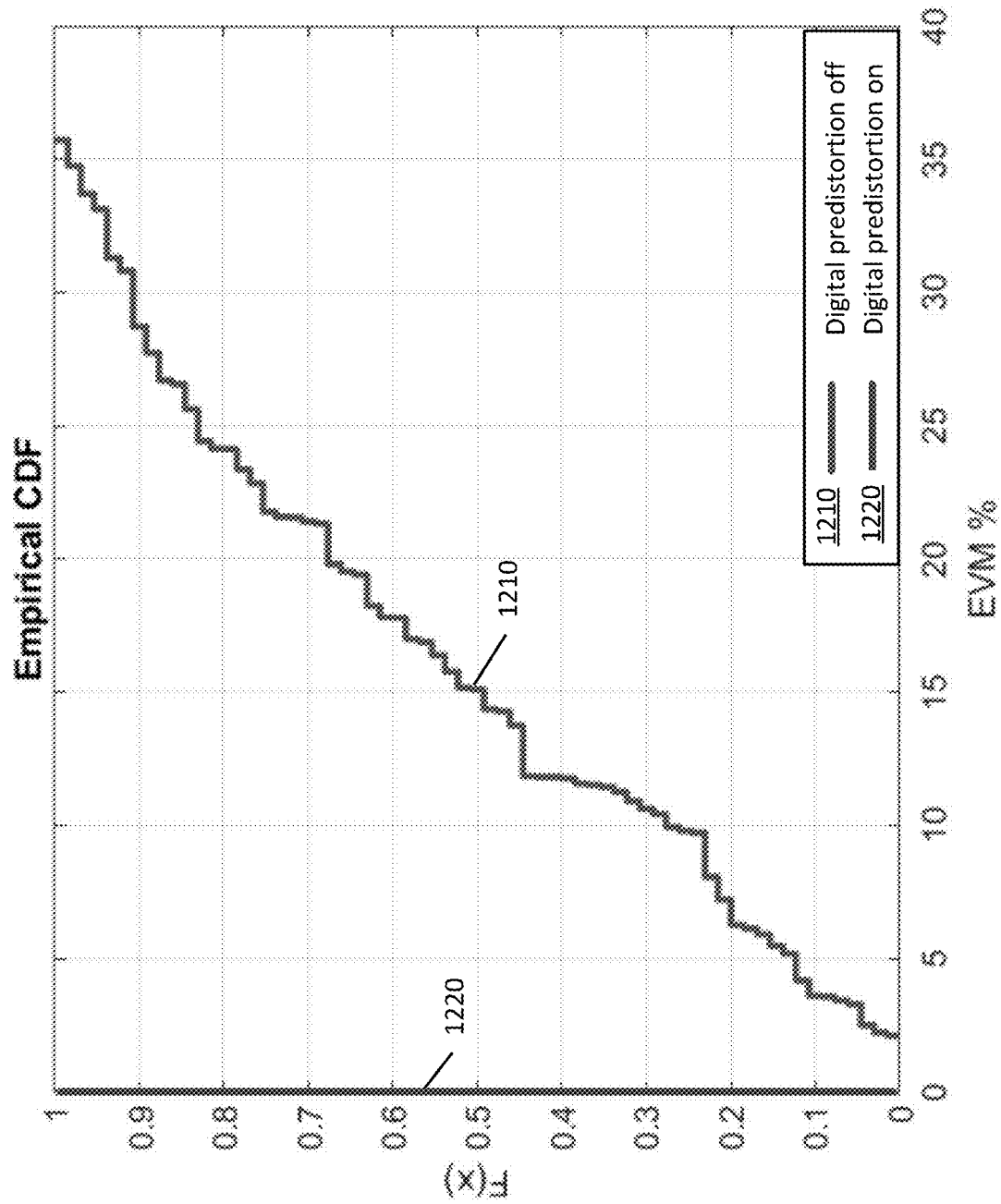
FIG. 12 is a graph of an empirical cumulative distribution function (CDF) of an error vector magnitude (EVM) expressed in % of received QPSK symbols, in accordance with various example embodiments of the present disclosure.

Referring next to FIG. 12, a graph 1200 illustrating empirical cumulative distribution function (CDF) of an error vector magnitude (EVM) expressed in % of received QPSK symbols will be discussed in accordance with various example embodiments of the present disclosure. It will be appreciated that EVM is a common figure of merit used to evaluate the quality of transmitted signals.

Graph 1200 includes two plots: plot 1210 illustrating EVMs of a constellation without using pre-distorted QPSK data symbols, and plot 1220 illustrating EVMs of a constellation using pre-distorted QPSK data symbols. Axis X is the EVM in % and axis Y is the probability that the EVM is less than or equal to a certain value. For example, according to 1200, the probability that EVM is less than or equal to 15% is around 0.5, and that it is less than or equal to 36% is 1.0. As can be observed from graph 1200, beam nulling using pre-distorted symbols provides a much lower error vector magnitude (EVM).

Figure 13:
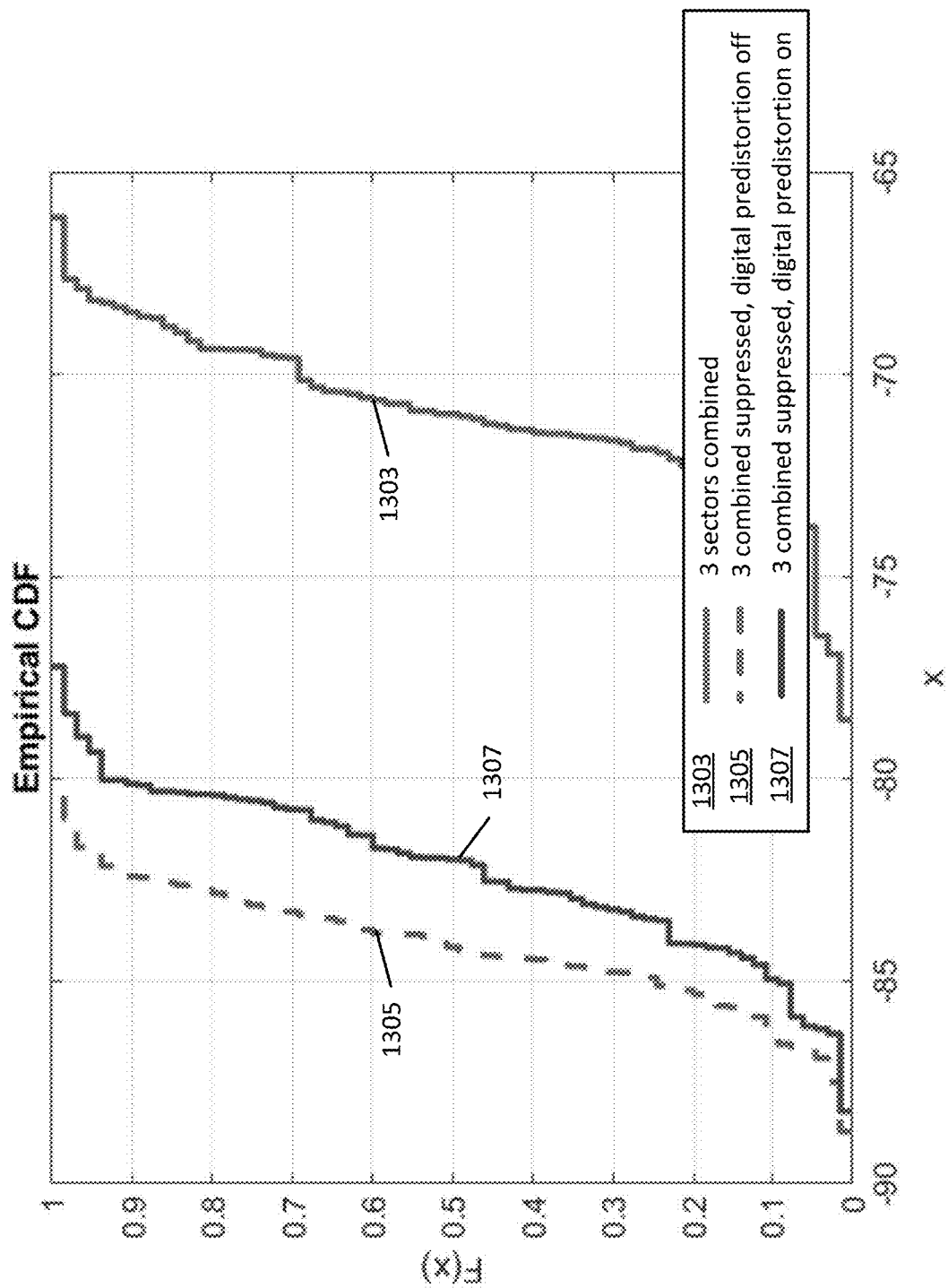
FIG. 13 is a graph of empirical cumulative distribution functions (CDFs) illustrating suppression of combined interference by beam-nulling, in accordance with various example embodiments of the present disclosure.

Referring next to FIG. 13, a graph 1300 illustrating combined interference will be discussed accordance with various example embodiments of the present disclosure.

Graph 1300 includes three plots: plot 1303 illustrating combined interference without suppression by beam nulling, plot 1305 illustrating combined interference suppressed by beam nulling without pre-distorted symbols, and plot 1307 illustrating combined interference suppressed by beam nulling with pre-distorted symbols.

As illustrated by graph 1300, combined interference without beam nulling (plot 1303) is least effective at suppressing combined interference. Beam nulling without predistortion (plot 1305) is slightly more effective than beam nulling using predistortion (plot 1307). However, UE receiver may not be able to effectively receive transmitted data without the use of pre-distortion. The effectiveness of the beam nulling in FIG. 13 was assessed using normalized interference power at the most affected RX antenna element. These values were obtained for a set of beam directions in the range of ±45° in azimuth and ±25° in elevation. Each sample for generating an empirical CDF curve differs in beam direction in each sector and data symbol in each sector. Data symbols were taken from a QPSK constellation.

Figure 14:
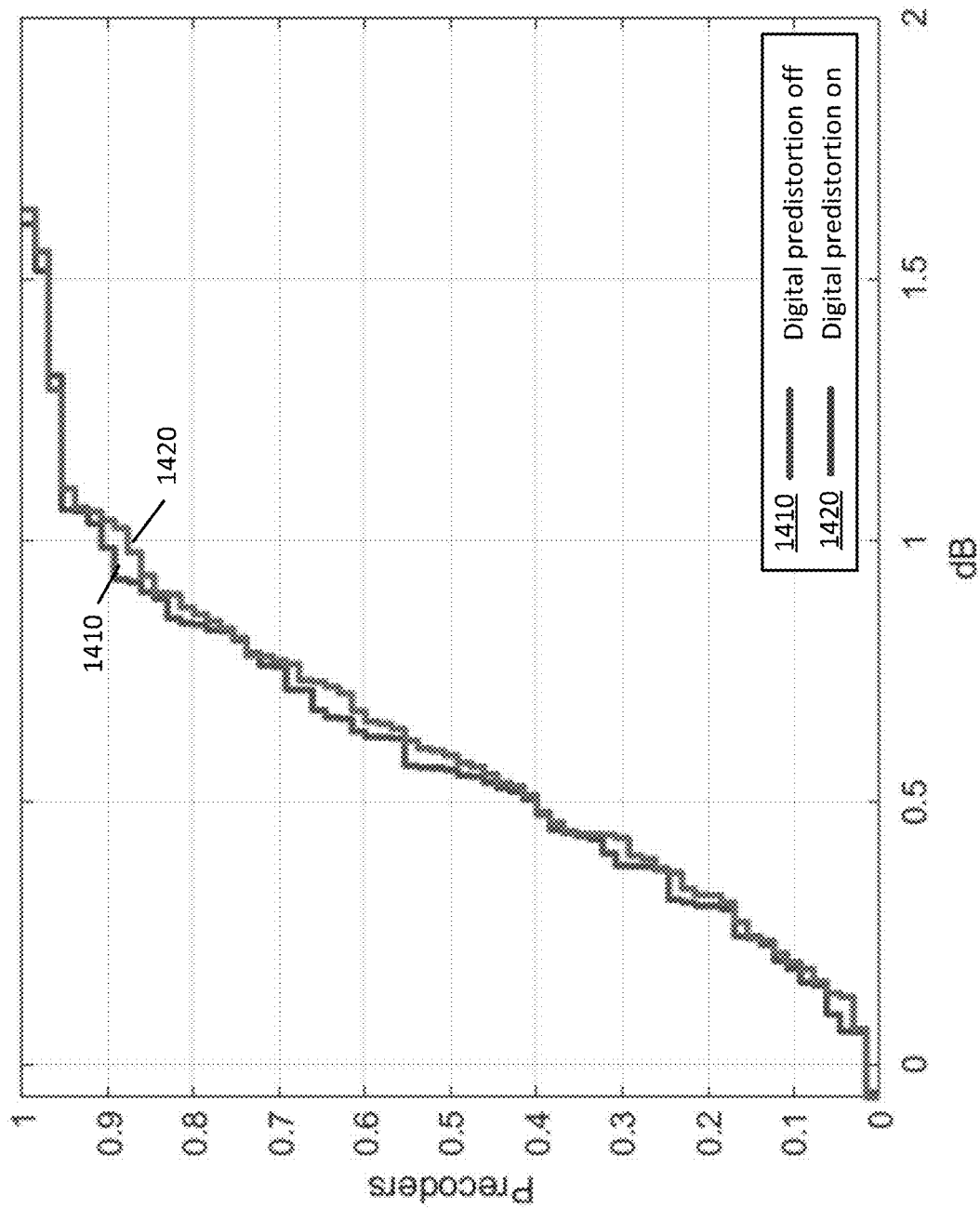
FIG. 14 is a graph illustrating effects of data symbol pre-distortion on equivalent isotropic radiated power (EIRP) loss, in accordance with various example embodiments of the present disclosure.

Referring next to FIG. 14, a graph 1400 illustrating equivalent isotropic radiated power (EIRP) will be discussed in accordance with various example embodiments of the present disclosure. Graph 1400 includes two plots: plot 1410 illustrating EIRP loss without pre-distorted data symbols, and plot 1420 illustrating EIRP loss with pre-distorted data symbols.

As illustrated by graph 1400, the use of predistortion may cause an additional, although very limited, EIRP loss, as compared with using non-distorted data symbols. The data illustrated in graph 1400 represents normalized interference power at the most affected RX antenna element. the values were obtained for a set of beam directions in the range of ±45° in azimuth and ±25° in elevation. Each sample for generating plots 1410 and 1420 differs in beam direction in each sector and data symbol in each sector. Data symbols were taken from a QPSK constellation.

Figure 15:
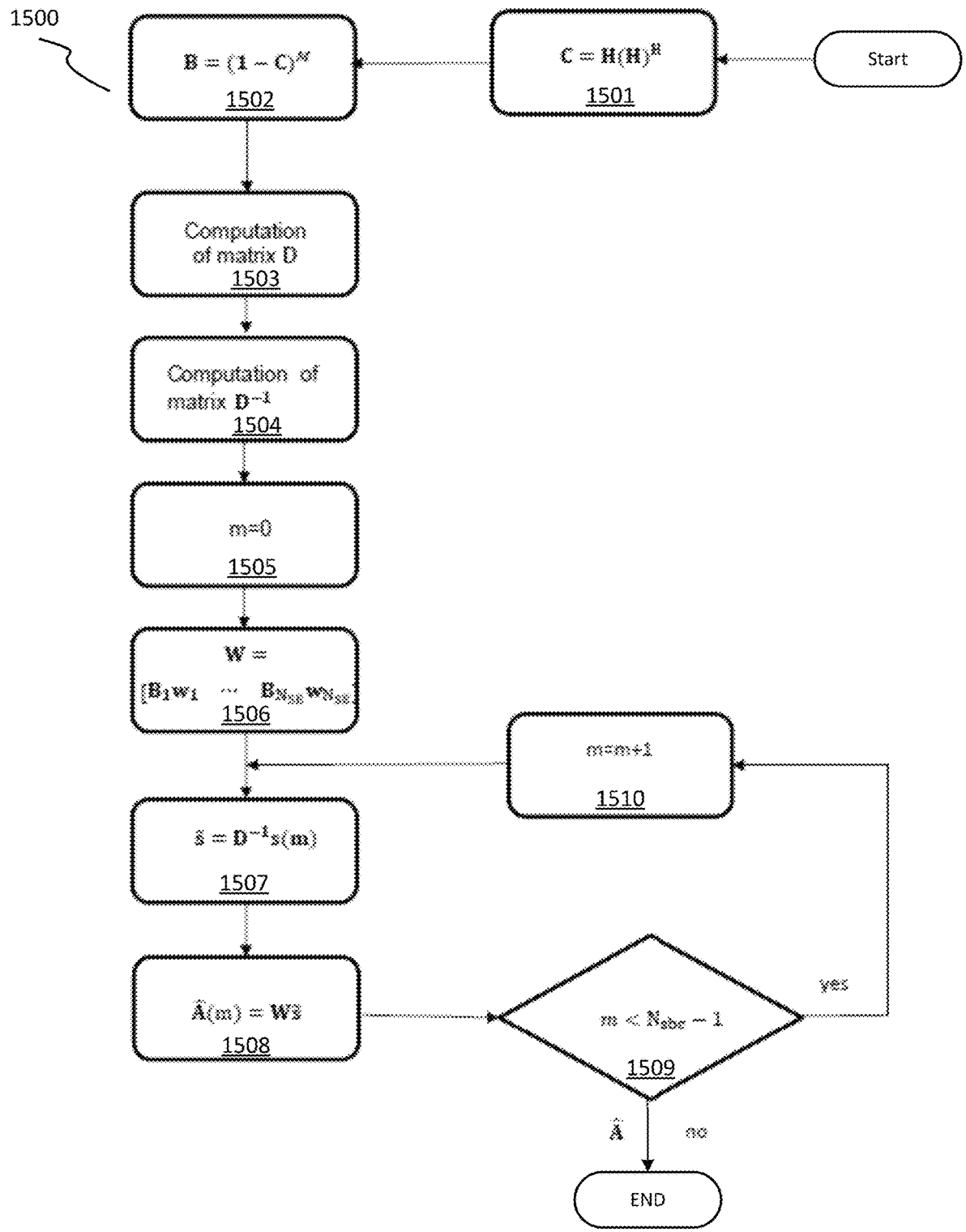
FIG. 15 is a block diagram illustrating a method, in accordance with various example embodiments of the present disclosure.

FIG. 15 illustrates a method 1500, in accordance with various example embodiments of the present disclosure. In various example embodiments, method 1500 may be implemented by the centralized system 600 (FIG. 6) and/or distributed system 800 (FIG. 8), as applied to $N_{sbc}$ subcarriers.

In various example embodiments, the description of various example embodiments of FIG. 15 includes the following assumptions: the interference matrix H, the untransformed beamforming vector $\vec{w}_k$ and the far-field channel vector $\vec{h}_k$ remain the same for $N_{sbc}$ neighbour subcarriers. The data symbol vector s changes every subcarrier and s(m) denotes this vector applied to the subcarrier m=0, . . . , $N_{sbc}$–1. In some example embodiments, $N_{sbc}$ may be equal, for example, to the number of subcarriers in a resource block (RB), or resource block group (RBG).

As illustrated by block 1501, the interference channel covariance matrix C may be computed per equation (11).

As illustrated by block 1502 the matrix B may be computed according to equation (6). In at least one example embodiment, matrix B may be calculated once for $N_{sbc}$ subcarriers but used for each of those subcarriers.

As illustrated by block 1503 the matrix D may be computed according to equation (13).

As illustrated by block 1504 the inverse of the matrix D may be computed. In at least one example embodiment, the inverse of the matrix D is performed not for each subcarrier, but once for $N_{sbc}$ subcarriers.

As illustrated by block 1505 a subcarrier counter is initialized.

As illustrated by block 1506 beamforming matrix W may be computed according to equation (3).

As illustrated by block 1507 the pre-distorted data symbols for subcarrier may be computed according to equation (14).

As illustrated by block 1508, for the centralized case, the beamformed data symbol vector for subcarrier m and for all $N_{SE}$ sectors, denoted by Â(m), may be computed according to equation (1) where the vector of the data symbols s is replaced by the vector of the pre-distorted data symbols š".

A check is made at block 1509 to determine if there are more subcarriers for which $\hat{A}_k(m)$ needs to be calculated, and if so, method 1500 the subcarrier counter initialized at block 1505 is incremented at block 1510. Method 1500 may iteratively execute blocks 1507, 1508, 1509, and 1510. If the check made at block 1509 results in a determination that there are no more subcarriers for which $\hat{A}_k(m)$ needs to be calculated, method 1500 ends.

Figure 16:
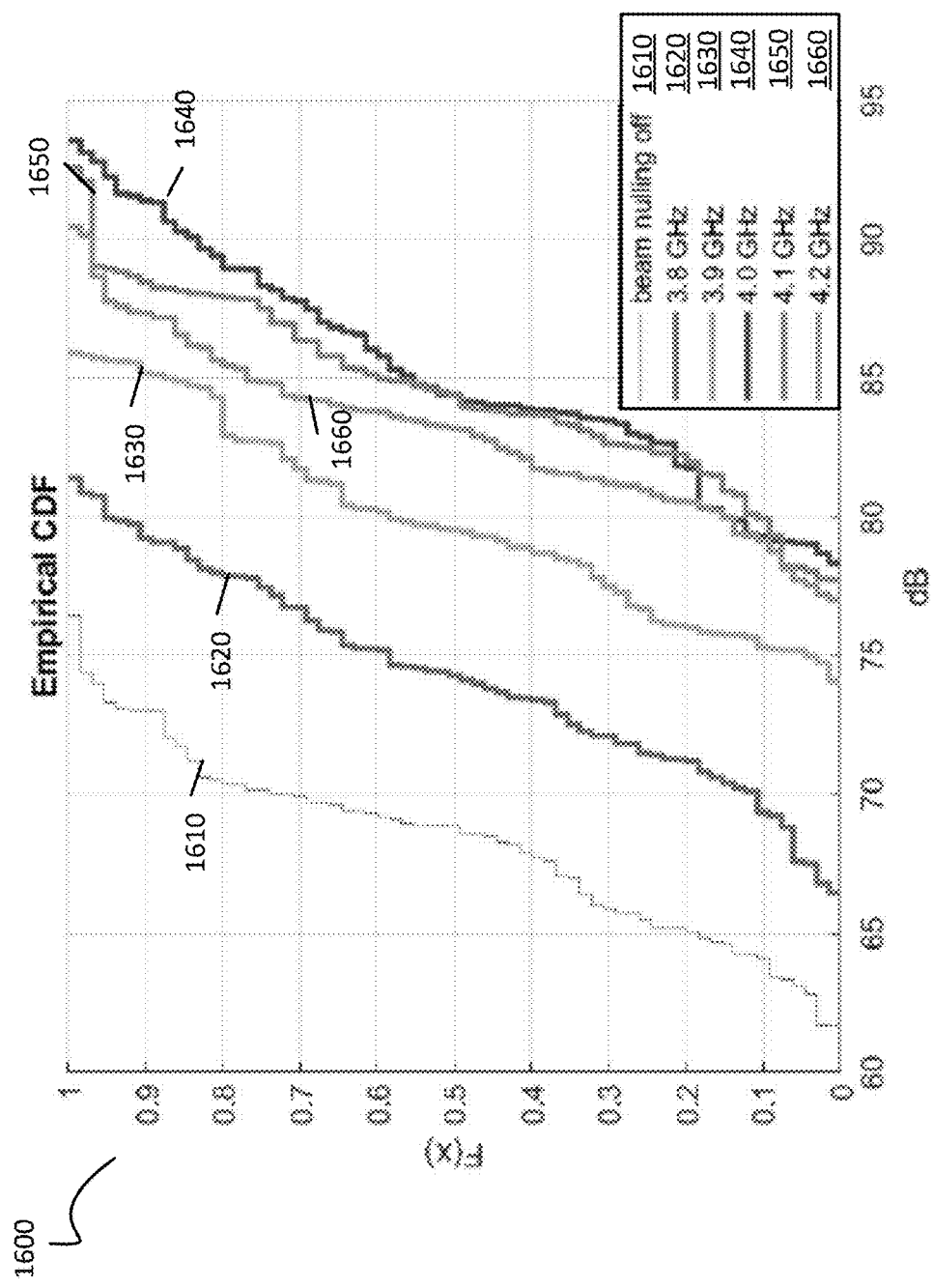
FIGS. 16 and 17 are graphs of empirical cumulative distribution functions (CDFs) illustrating isolation provided by beam nulling, in accordance with various example embodiments of the present disclosure.
Figure 17:
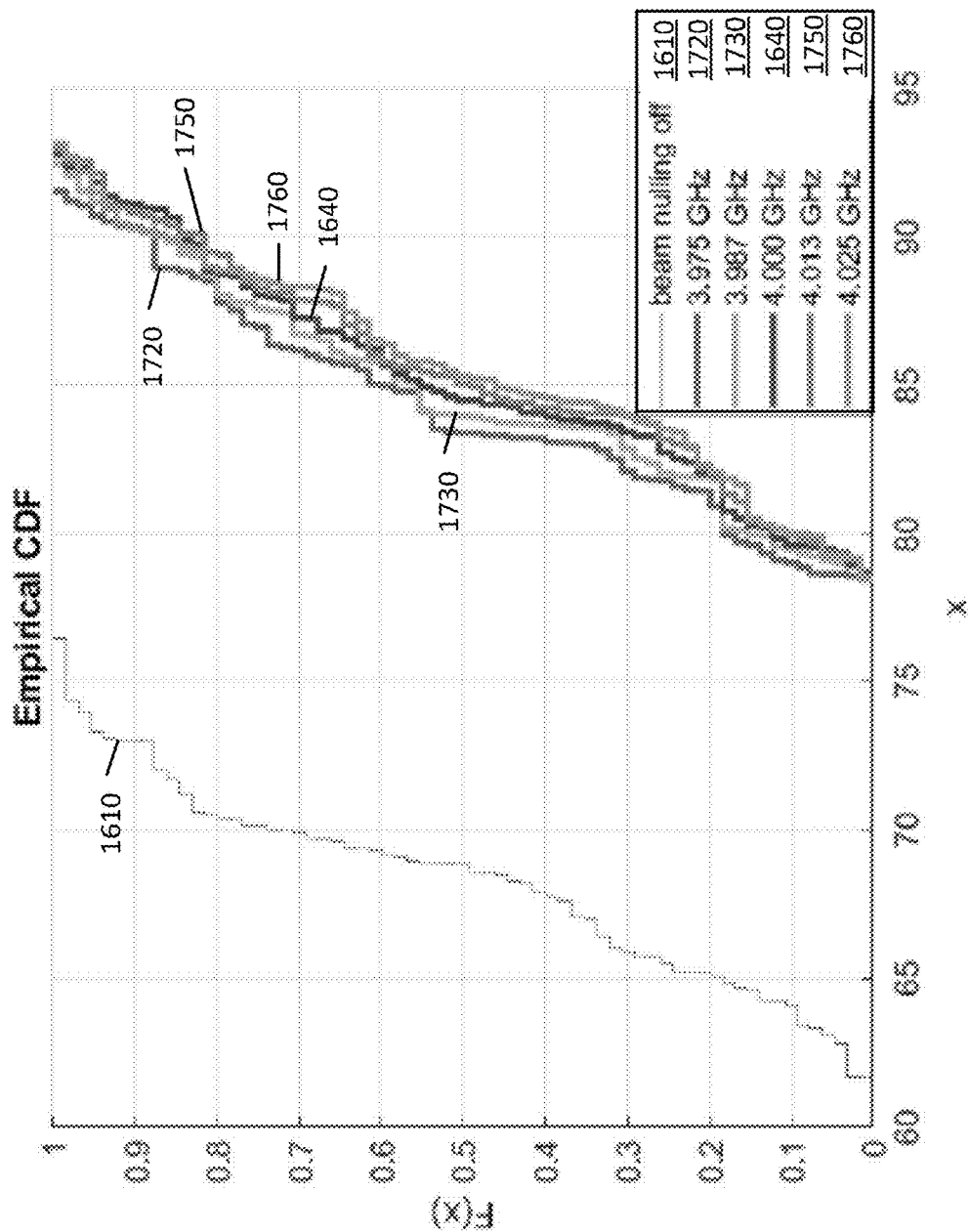

Referring next to FIGS. 16 and 17, graphs 1600 and 1700 graphs of empirical cumulative distribution functions (CDFs) showing additional isolation provided by beam nulling will be discussed in accordance with various example embodiments of the present disclosure. Note that each curve at 1600 and 1700 shows combined isolation provided by beam nulling and spatial isolation, provided by the separation of the TX and RX panels in space.

Graph 1600 includes Beam Nulling Off trace 1610, 3.8 GHz trace 1620, 3.9 GHz trace 1630, 4.0 GHz trace 1640, 4.1 GHz trace 1650, and 4.2 GHz trace 1660. Graph 1700 includes Beam Nulling Off trace 1610, 3.975 GHz trace 1720, 3.987 GHz trace 1730, 4.0 GHz trace 1640, 4.013 GHz trace 1750, and 4.025 GHz trace 1760. The traces in both graph 1600 and 1700 represent simulations of beam nulling isolation calculated at 4 GHZ.

Examination of graphs 1600 and 1700 show that if the signal bandwidth, corresponding to $N_{sbc}$, is about 1.3% of the carrier frequency (50 MHz for 4 GHz carrier frequency), then isolation, provided by beam nulling, changes very little over the frequency band. If this ratio is 10%, then isolation at the edges of the band is considerably smaller than at the center. Note that 50 MHz corresponds to approximately 139 RB with 30 kHz subcarrier spacing and $N_{sbc} \approx 1667$.

To estimate $N_{sbc}$ 1-sector simulations were performed. Beam nulling was calculated for a central frequency of the frequency band and then applied to different frequencies within this frequency band.

Figure 18:
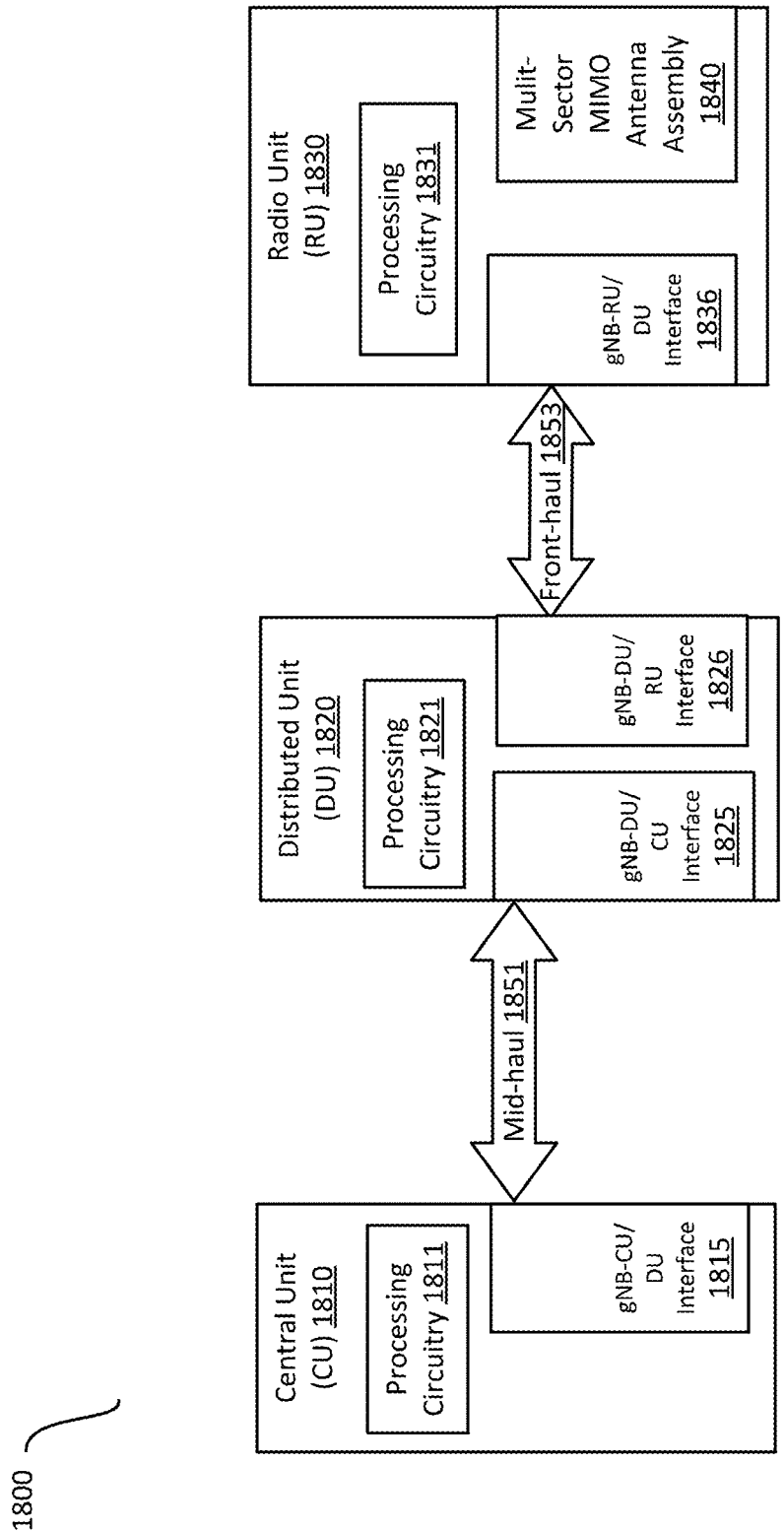
FIG. 18 is a functional block diagram of a base station, in accordance with various example embodiments of the present disclosure.

Referring next to FIG. 18, a base station (BS) 1800 will be discussed in accordance with various example embodiments of the present disclosure. In some example embodiments, BS 1800 may be transceiver serving as the main communication point and/or connection to a backbone communication network, for one or more wireless mobile client devices, also referred to as UE. BS 1800 may include, but is not limited to, a gNodeB (gNB). In various example embodiments, BS 1800 may include logical architecture consistent with a fifth generation new radio gNodeB (5G NR gNB). In some such example embodiments, functional units of BS 1800 include, but are not limited to, a central unit (CU) 1810, a distributed unit (DU) 1820, and/or a radio unit (RU) 1830. CU 1810 may include processing circuitry 1811, and gNB-CU/DU Interface 1815. DU 1820 may include processing circuitry 1821, gNB-DU/CU Interface 1825, and gNB-DU/RU Interface 1826. RU 1830 may include processing circuitry 1831, and gNB-RU/DU Interface 1836, and a multi-sector multiple-input multiple-output (MIMO) antenna assembly 1840, of which three-sector antenna setup 300 (FIG. 3) is an example.

In some example embodiments, processing circuitry 1811 of CU 1810 is responsible for overall control of BS 1800. For example, processing circuitry 1811 may manage and coordinate radio resources, control the mobility of devices within a cell, and the like. In some example embodiments, CU 1810, and its processing circuitry 1811, may be further divided into two subcomponents (not illustrated): the Central Unit-Distributed (CU-CP) and the Central Unit-Centralized (CU-UP), where the CU-CP handles control plane functions, and CU-UP is responsible for the user plane functions. CU 1810 may communicate with DU 1820 over mid-haul communication channel 1851.

In various example embodiments, processing circuitry 1821 included in DU 1820 may be responsible for lower-layer processing of radio signals, and may modulate, encode, and decode radio signals. In at least some of the example embodiments, processing circuitry 1821 performs at least some portion of signal predistortion, beam nulling matrix generation, beam nulling matrix transformations, and/or final beam forming, as discussed above, and particularly with respect to FIGS. 6, 8, and 15. In other example embodiments, processing circuitry 1821 performs one or more of generating pre-distorted signals and beam nulling transformations, leaves the final beam forming to be performed by RU 1830.

In some example embodiments, DU 1820 may also be divided into two subcomponents: a Distributed Unit-Centralized (DU-CP) responsible for control plane processing, and a Distributed Unit-Distributed (DU-UP) responsible for user plane processing. DU 1820 may communicate with CU 1810 via mid-haul communication channel 1851, and with RU 1830 via front haul communication channel 1853.

In various example embodiments RU 1830 is responsible for the radio transmission and reception, and processing circuitry 1831 may include various radio frequency (RF) processing hardware and/or software. In some example embodiments, processing circuitry 1831 performs at least some portion of signal predistortion, beam nulling matrix generation, beam nulling matrix transformations, and/or final beam forming, as discussed above, and particularly with respect to FIGS. 6, 8, and 15. In some example embodiments, processing circuitry 1831 receives pre-distorted signals and beam nulling matrices from DU 1820 via front haul 1853, and uses that information to generate the final beam-formed data symbols to be delivered to Multi-Sector MIMO Antenna Assembly 1840 for transmission to UE. In some example embodiments, processing circuitry 1831 receives and/or generates an untransformed downlink beamforming matrix, and generates the transformed DL beamforming matrix by transforming a DL beamforming matrix into a transformed DL beamforming matrix using a first closed-form expression, as disclosed above.

In some example embodiments, one or more of CU 1810, DU 1820, and/or RU 1830 may be co-located, and some or all of processing circuitry 1811, 1821, and/or 1831 may be shared among CU 1810, DU 1820, and/or RU 1830.

In various example embodiments, gNB-CU/DU Interface 1815 and gNB-DU/CU Interface 1825 are specially configured to facilitate communication between the CU 1810 and the DU 1820 over mid-haul 1851. In some example embodiments gNB-CU/DU Interface 1815 and gNB-DU/CU Interface 1825 are standardized to allow interoperability between different vendors' equipment.

The interfaces may be defined by functional splits, which define how the processing functions are distributed between different elements of the gNB architecture are distributed between the CU and DU. In some example embodiments, there may be two main functional splits: the CU-DU split and the DU-RU split.

The CU-DU split may define the separation between the central unit (CU) functions and distributed unit (DU) functions. It may allow for flexibility in the deployment of the network, enabling the CU and DU to be located at different physical locations. The DU-RU Split may define the separation between the lower-layer processing (DU) and the radio transmission/reception (RU). It may for the DU to be located closer to the antennas, facilitating the use of centralized processing resources.

Various example embodiments may implement different DU-RU splits, for example when implementing centralized or distributed beamforming as discussed above with respect to FIGS. 6 and 8. For example, a base station distributed unit (DU) may have processing circuitry configured to transform a downlink (DL) beamforming matrix into a transformed DL beamforming matrix using a first closed-form expression, wherein the transformed DL beamforming matrix is configured to suppress both self-interference and cross-sector interference at individual receiver antenna array elements in a multi-sector antenna arrangement, and transmit the transformed DL beamforming matrix to a base station radio unit (base station RU), which may generate beamformed data symbols.

Figure 19:
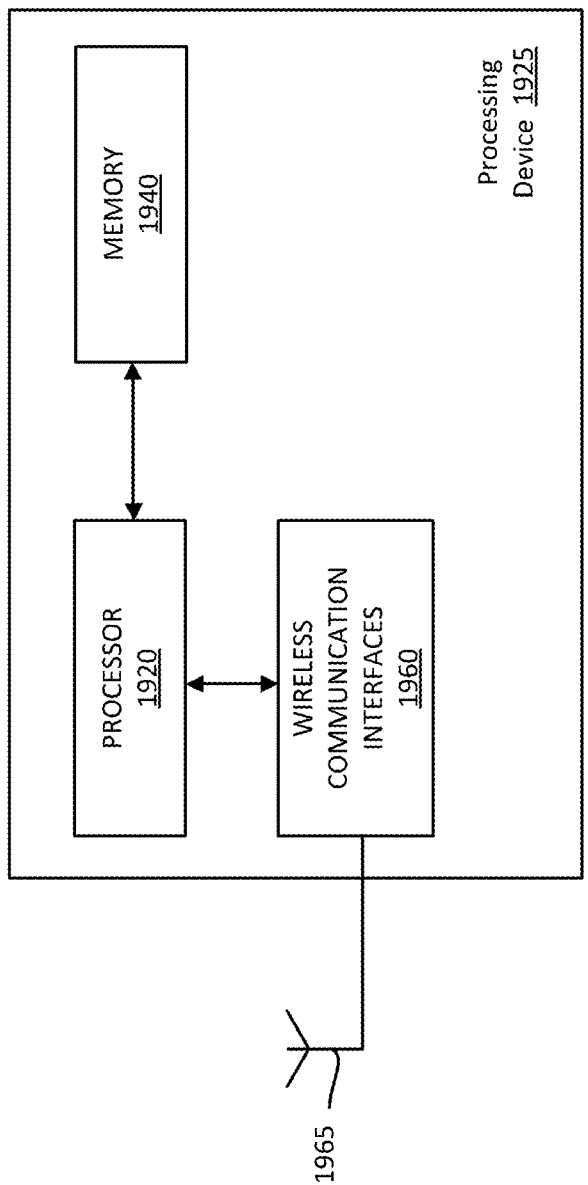
FIG. 19 is a block diagram of a processing device, in accordance with various example embodiments of the present disclosure.

Referring next to FIG. 19 a processing device 1925, in accordance with various example embodiments. Processing device 1925 can be used to implement any of various example embodiments disclosed herein. For example, a base station, gNB, or other network node, user equipment (UE), encoders, decoders, channel estimators, drift detectors, regressors, cloud computing devices, or the like. As shown, processing device 1925 includes: a memory 1940; a processor 1920 connected to the memory 1940; various interfaces 1960 connected to the processor 1920; and one or more (e.g., a plurality of) antennas or antenna panels 1965 connected to the various interfaces 1960. The various interfaces 1960 and the antenna 1965 may constitute a transceiver for transmitting/receiving data from/to other network elements (e.g., other UEs, gNBs, LMFs, TRPs, etc.) via one or more antenna beams. Depending on the implementation of processing device 1925, the processing device 1925 may include many more components than those shown in FIG. 19. However, it is not necessary that all of these generally conventional components be shown in order to disclose the illustrative example embodiment(s).

The memory 1940 may be a computer readable storage medium that generally includes a random-access memory (RAM), read only memory (ROM), and/or a permanent mass storage device, such as a disk drive. The memory 1940 also stores an operating system and any other routines/modules/applications for providing the functionalities of processing device 1925 to be executed by the processor 1920. These software components may also be loaded from a separate computer readable storage medium into the memory 1940 using a drive mechanism (not shown). Such separate computer readable storage medium may include a disc, tape, DVD/CD-ROM drive, memory card, or other like computer readable storage medium (not shown). In some example embodiments, software components may be loaded into the memory 1940 via one of the various interfaces 1960, rather than via a computer readable storage medium.

The processor 1920 may be configured to carry out instructions of a computer program by performing the arithmetical, logical, and input/output operations of the system. Instructions may be provided to the processor 1920 by the memory 1940.

The various interfaces 1960 may include components that interface the processor 1920 with the antenna 1965, or other input/output components. As will be understood, the various interfaces 1960 and programs stored in the memory 1940 to set forth the special purpose functionalities of the UE will vary depending on the implementation of the processing device 1925.

The interfaces 1960 may also include one or more user input devices (e.g., a keyboard, a keypad, a mouse, or the like) and user output devices (e.g., a display, a speaker, or the like).

According to one or more example embodiments, at least one memory may include or store computer-executable instructions which, when executed by at least one processor, cause a UE or gNB to perform one or more operations discussed herein.

Various example embodiments herein describe an apparatus, comprising multiple sector antennas associated with sectors, each sector antenna of the sector antennas includes a reception array of antenna array elements and a transmission array of antenna array elements, and wherein each sector antenna is configured for transmitting signals, using the transmission array, to devices within a sector of the sectors that is associated with the sector antenna and for receiving signals, using the reception array, from devices within the sector; processing circuitry configured to transform a downlink (DL) beamforming matrix into a transformed DL beamforming matrix using a closed-form expression, wherein the transformed DL beamforming matrix is configured to suppress both self-interference and cross-sector interference at individual receiver antenna array elements in a multi-sector antenna arrangement, generate beamformed data symbols associated with a current sector based on the transformed DL beamforming matrix, and deliver the beamformed data symbols associated with a current sector to a DL transmit (TX) antenna included in the multi-sector antenna arrangement.

In example embodiments of the above apparatus, the processing circuitry may be further configured to: generate the beamformed data symbols by applying the transformed DL beamforming matrix to pre-distorted data symbols, wherein the pre-distorted data symbols are addressed to devices associated with different sectors. According to either of the above example embodiments, the processing circuitry may be further configured to: generate a predistortion matrix; and generate the beamformed data symbols by multiplying together undistorted data symbols, the transformed DL beamforming matrix, and the predistortion matrix, wherein the undistorted data symbols are addressed to devices associated with different sectors.

In any of any of the above example embodiments, the processing circuitry may be further configured to: generate a plurality of transformed DL beamforming matrices for a plurality of sectors of the multi-sector antenna arrangement; and generate, at a beamforming block, the beamformed data symbols for the plurality of sectors using the plurality of transformed DL beamforming matrices. The processing circuitry in any of the above example embodiments may also be further configured to: determine an interference channel covariance matrix, wherein the interference channel covariance matrix describes a covariance among interference channels between individual transmit antenna array elements and individual receive antenna array elements of the multi-sector antenna arrangement; and to transform the DL beamforming matrix into the transformed DL beamforming matrix based on a matrix polynomial generated based on the interference channel covariance matrix, wherein the matrix polynomial is generated once for a given number of subcarriers, and wherein the given number of subcarriers is determined based, at least in part, on a signal bandwidth, a subband size, and a variability of the interference channel covariance matrix.

In various example embodiments, at least one of the above example embodiments of the apparatus of claim 5 includes processing circuitry is further configured to transform the DL beamforming matrix into the transformed DL beamforming matrix based on a predistortion matrix, wherein the predistortion matrix is generated based in part on the matrix polynomial, transform the DL beamforming matrix into the transformed DL beamforming matrix based on an inverse predistortion matrix, wherein the inverse predistortion matrix is generated once for the given number of subcarriers, generate the beamformed data symbols on a per-subcarrier basis, generate the beamformed data symbols for a subcarrier over all sectors of the multi-sector antenna arrangement, and/or generate the beamformed data symbols for a subcarrier over a sector of the multi-sector antenna arrangement.

The apparatus of any of the above example embodiments may further include a base station distributed unit (DU) including processing circuitry configured to transform the downlink (DL) beamforming matrix into a transformed DL beamforming matrix using the first closed-form expression, and transmit the transformed DL beamforming matrix to a base station radio unit (base station RU) for use in generating beamformed data symbols. In some such example embodiments of the above apparatus, the processing circuitry included in the base station DU is further configured to: determine an interference channel covariance matrix, transform the DL beamforming matrix into the transformed DL beamforming matrix based on a matrix polynomial, and transform the DL beamforming matrix into the transformed DL beamforming matrix based on an inverted predistortion matrix, generated once for the given number of subcarriers.

Some example embodiments of the above apparatus further comprising a base station radio unit (RU) including processing circuitry configured to generate beamformed data symbols based on the transformed DL beamforming matrix and data symbols addressed to devices associated with different sectors, and deliver the beamformed data symbols to a DL transmit (TX) antenna included in the multi-sector antenna arrangement.

The processing circuitry included in the base station RU may be further configured to receive, from the base station DU, a plurality of transformed DL beamforming matrices for a plurality of sectors of the multi-sector antenna arrangement; and generate the beamformed data symbols for the plurality of sectors using the plurality of transformed DL beamforming matrices, and/or receive, from the base station DU, a transformed DL beamforming matrix for an individual sector of the multi-sector antenna arrangement; and generate the beamformed data symbols for the individual sector of the multi-sector antenna arrangement using the transformed DL beamforming matrix.

As discussed herein, the terminology "one or more" and "at least one" may be used interchangeably.

The term, "UE" is an acronym for user equipment, and is used in both the singular and plural sense. UE can include, and may also be referred to herein, as a mobile station, and may include a mobile phone, a cell phone, a smartphone, a handset, a personal digital assistant (PDA), a tablet, a laptop computer, a phablet, a vehicle including a vehicular communication system, an Internet-of-Things (IoT) device, a robot, or the like.

As discussed herein, transmission resources may also be referred to as radio or cellular resources for transmitting, and may include, for example, time and/or frequency resources for transmitting information and/or data between devices.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the preceding description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

As discussed herein, illustrative embodiments have been described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently, or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing, or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory, and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, other network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. An apparatus, comprising:
    multiple sector antennas associated with sectors, each sector antenna of the sector antennas includes a reception array of antenna array elements and a transmission array of antenna array elements, and wherein each sector antenna is configured for transmitting signals, using the transmission array, to devices within a sector of the sectors that is associated with the sector antenna and for receiving signals, using the reception array, from devices within the sector; and
    processing circuitry configured to
        transform a downlink beamforming matrix into a transformed downlink beamforming matrix using a closed-form expression, wherein the transformed downlink beamforming matrix is configured to suppress both self-interference and cross-sector interference at individual receiver antenna array elements in a multi-sector antenna arrangement,
        generate a predistortion matrix, generate beamformed data symbols associated with a current sector based on the transformed downlink beamforming matrix by multiplying together undistorted data symbols, the transformed downlink beamforming matrix, and the predistortion matrix, wherein the undistorted data symbols are addressed to devices associated with different sectors, and
        deliver the beamformed data symbols associated with a current sector to a downlink transmit antenna included in the multi-sector antenna arrangement.

2. The apparatus of claim 1, wherein the processing circuitry is further configured to:
    generate the beamformed data symbols by applying the transformed downlink beamforming matrix to pre-distorted data symbols, wherein the pre-distorted data symbols are addressed to devices associated with different sectors.

3. The apparatus of claim 1, wherein the processing circuitry is further configured to:
    generate a plurality of transformed downlink beamforming matrices for a plurality of sectors of the multi-sector antenna arrangement; and
    generate, at a beamforming block, the beamformed data symbols for the plurality of sectors using the plurality of transformed downlink beamforming matrices.

4. The apparatus of claim 1, wherein the processing circuitry is configured is further configured to:
    determine an interference channel covariance matrix, wherein the interference channel covariance matrix describes a covariance among interference channels between individual transmit antenna array elements and individual receive antenna array elements of the multi-sector antenna arrangement; and
    the processing circuitry is further configured to transform the downlink beamforming matrix into the transformed downlink beamforming matrix based on a matrix polynomial generated based on the interference channel covariance matrix, wherein the matrix polynomial is generated once for a given number of subcarriers, and wherein the given number of subcarriers is determined based, at least in part, on a signal bandwidth, a subband size, and a variability of the interference channel covariance matrix.

5. The apparatus of claim 4, wherein the processing circuitry is further configured to:
    transform the downlink beamforming matrix into the transformed downlink beamforming matrix based on a predistortion matrix, wherein the predistortion matrix is generated based in part on the matrix polynomial.

6. The apparatus of claim 5, wherein the processing circuitry is further configured to:
    transform the downlink beamforming matrix into the transformed downlink beamforming matrix based on an inverse predistortion matrix, wherein the inverse predistortion matrix is generated once for the given number of subcarriers.

7. The apparatus of claim 1, wherein the processing circuitry is further configured to:
    generate the beamformed data symbols on a per-subcarrier basis.

8. The apparatus of claim 1, wherein the processing circuitry is further configured to:
    generate the beamformed data symbols for a subcarrier over all sectors of the multi-sector antenna arrangement.

9. The apparatus of claim 1, wherein the processing circuitry is further configured to:
    generate the beamformed data symbols for a subcarrier over a sector of the multi-sector antenna arrangement.

10. A base station distributed unit comprising:
    processing circuitry configured to
        transform a downlink beamforming matrix into a transformed downlink beamforming matrix using a first closed-form expression and based on a predistortion matrix, wherein the predistortion matrix is generated based in part on a matrix polynomial, wherein the transformed downlink beamforming matrix is configured to suppress both self-interference and cross-sector interference at individual receiver antenna array elements in a multi-sector antenna arrangement, and
        transmit the transformed downlink beamforming matrix to a base station radio unit for use in generating beamformed data symbols.

11. The base station distributed unit of claim 10, wherein the processing circuitry is further configured to:
    determine an interference channel covariance matrix, wherein the interference channel covariance matrix describes a covariance among interference channels between individual transmit antenna array elements and individual receive antenna array elements of the multi-sector antenna arrangement.

12. The base station distributed unit of claim 11, wherein the processing circuitry is further configured to:
    transform the downlink beamforming matrix into the transformed downlink beamforming matrix based on a matrix polynomial, wherein the matrix polynomial is generated based on an identity matrix and the interference channel covariance matrix, wherein the matrix polynomial is generated once for a given number of subcarriers, wherein the given number of subcarriers is determined based on a signal bandwidth of a carrier frequency.

13. The base station distributed unit of claim 10, wherein the processing circuitry is further configured to:

transform the downlink beamforming matrix into the transformed downlink beamforming matrix based on an inverse predistortion matrix, wherein the inverse predistortion matrix is generated once for the given number of subcarriers.

14. A base station comprising:

multiple sector antennas associated with sectors, each sector antenna of the sector antennas includes a reception array of antenna array elements (215) and a transmission array of antenna array elements (205), and wherein each sector antenna is configured for transmitting signals, using the transmission array, to devices within a sector of the sectors that is associated with the sector antenna and for receiving signals, using the reception array, from devices within the sector; and processing circuitry configured to determine an interference channel covariance matrix, wherein the interference channel covariance matrix describes a covariance among interference channels between individual transmit antenna array elements and individual receive antenna array elements of the multi-sector antenna arrangement, transform a downlink beamforming matrix into a transformed downlink beamforming matrix using a closed-form expression, based on a matrix polynomial, wherein the matrix polynomial is generated based on an identity matrix and the interference channel covariance matrix, wherein the matrix polynomial is generated once for a given number of subcarriers, wherein the given number of subcarriers is determined based on a signal bandwidth of a carrier frequency, and based on an inverse predistortion matrix, wherein the inverse predistortion matrix is generated once for the given number of subcarriers, generate beamformed data symbols based on a transformed downlink beamforming matrix and data symbols addressed to devices associated with different sectors, wherein the transformed downlink beamforming matrix is configured to suppress both self-interference and cross-sector interference at individual receiver antenna array elements in a multi-sector antenna arrangement; and deliver the beamformed data symbols to a downlink transmit antenna included in the multi-sector antenna arrangement.

15. The base station of claim 14, wherein the processing circuitry is further configured to:

receive the transformed downlink beamforming matrix from a base station distributed unit.

16. The base station of claim 14, wherein the processing circuitry is further configured to:

receive, from the base station distributed unit, a plurality of transformed downlink beamforming matrices for a plurality of sectors of the multi-sector antenna arrangement; and generate the beamformed data symbols for the plurality of sectors using the plurality of transformed downlink beamforming matrices.

17. The base station of claim 14, wherein the processing circuitry is further configured to:

receive, from the base station distributed unit, a transformed downlink beamforming matrix for an individual sector of the multi-sector antenna arrangement; and generate the beamformed data symbols for the individual sector of the multi-sector antenna arrangement using the transformed downlink beamforming matrix.

18. The base station of claim 14, wherein the processing circuitry is further configured to:

generate the transformed downlink beamforming matrix by transforming a downlink beamforming matrix into a transformed downlink beamforming matrix using a first closed-form expression.

* * * * *